US012475281B1

(12) United States Patent
Box et al.

(10) Patent No.: US 12,475,281 B1
(45) Date of Patent: Nov. 18, 2025

(54) VALIDATING AUTONOMOUS VEHICLE SIMULATION SCENARIOS

(71) Applicant: Aurora Innovation, Inc., Palo Alto, CA (US)

(72) Inventors: Simon Box, San Francisco, CA (US); Clinton Wade Liddick, Cupertino, CA (US); John Michael Wyrwas, Cupertino, CA (US)

(73) Assignee: Aurora Operations, Inc., Pittsburgh, PA (US)

( * ) Notice: Subject to any disclaimer, the term of this patent is extended or adjusted under 35 U.S.C. 154(b) by 761 days.

(21) Appl. No.: 17/119,231

(22) Filed: Dec. 11, 2020

Related U.S. Application Data

(60) Provisional application No. 62/988,307, filed on Mar. 11, 2020.

(51) Int. Cl.
*G06F 7/48* (2006.01)
*G06F 18/21* (2023.01)
*G06F 18/214* (2023.01)
*G06F 30/27* (2020.01)

(52) U.S. Cl.
CPC .......... *G06F 30/27* (2020.01); *G06F 18/2155* (2023.01); *G06F 18/2185* (2023.01)

(58) Field of Classification Search
CPC ................. G06F 30/27; G06F 18/2155; G06F 18/2185
See application file for complete search history.

(56) References Cited

U.S. PATENT DOCUMENTS

| 7,827,011 | B2 | 11/2010 | DeVaul et al. |
| 8,036,842 | B2 | 10/2011 | DeVaul et al. |
| 9,720,415 | B2 | 8/2017 | Levinson et al. |
| 9,836,895 | B1 | 12/2017 | Stout |
| 10,019,011 | B1 | 7/2018 | Green |
| 10,185,999 | B1 | 1/2019 | Konrardy et al. |

(Continued)

FOREIGN PATENT DOCUMENTS

| WO | 2019199880 A1 | 10/2019 |
| WO | 2022251692 A1 | 12/2022 |

OTHER PUBLICATIONS

Huang, WuLing, et al. "Autonomous vehicles testing methods review." 2016 IEEE 19th International Conference on Intelligent Transportation Systems (ITSC). IEEE, 2016.*

(Continued)

*Primary Examiner* — Nithya J. Moll
(74) *Attorney, Agent, or Firm* — Patent Law Works LLP

(57) ABSTRACT

Validating a simulation scenario for use in training a machine learning model for an autonomous vehicle includes determining a simulation scenario; executing a simulation based on a simulation scenario; monitoring execution of the simulation and receiving messages from the execution of the simulation; determining, by a first simulation monitor, whether the messages satisfy a first incident; and validating the simulation scenario responsive to the messages satisfying the first incident to produce validated simulation data. A system and method may also include determining, by a first simulation validator, whether the messages satisfy a condition; and validating the simulation scenario responsive to the messages satisfying the condition to produce validated simulation data.

20 Claims, 10 Drawing Sheets

(56) References Cited

U.S. PATENT DOCUMENTS

| | | | |
|---|---|---|---|
| 10,255,168 | B2 | 4/2019 | Stefan et al. |
| 10,831,202 | B1 | 11/2020 | Askeland et al. |
| 10,915,762 | B1 | 2/2021 | Russell |
| 11,086,319 | B2 | 8/2021 | Valois et al. |
| 11,087,477 | B2 | 8/2021 | Choi |
| 11,200,359 | B2 | 12/2021 | Wyrwas |
| 11,562,556 | B1 | 1/2023 | Kabzan |
| 2017/0123428 | A1 | 5/2017 | Levinson et al. |
| 2017/0371348 | A1 | 12/2017 | Mou |
| 2018/0136644 | A1 | 5/2018 | Levinson et al. |
| 2018/0275658 | A1 | 9/2018 | Iandola et al. |
| 2019/0025841 | A1 | 1/2019 | Haynes |
| 2019/0129436 | A1 | 5/2019 | Sun et al. |
| 2019/0152492 | A1 | 5/2019 | El Kaliouby et al. |
| 2019/0303759 | A1 | 10/2019 | Farabet et al. |
| 2020/0005631 | A1 | 1/2020 | Visintainer et al. |
| 2020/0074230 | A1 | 3/2020 | Englard et al. |
| 2020/0082034 | A1* | 3/2020 | Sholingar ............ G06F 30/20 |
| 2020/0097007 | A1 | 3/2020 | Dyer et al. |
| 2020/0125112 | A1 | 4/2020 | Mao et al. |
| 2020/0150665 | A1 | 5/2020 | Refaat et al. |
| 2020/0183387 | A1 | 6/2020 | Teit et al. |
| 2020/0293054 | A1 | 9/2020 | George et al. |
| 2021/0018916 | A1 | 1/2021 | Thakur et al. |
| 2021/0103742 | A1 | 4/2021 | Adeli-Mosabbeb et al. |
| 2021/0146919 | A1 | 5/2021 | Xu et al. |
| 2021/0263152 | A1 | 8/2021 | Halder |
| 2021/0309248 | A1 | 10/2021 | Choe |
| 2021/0403035 | A1 | 12/2021 | Danna |
| 2022/0116052 | A1 | 4/2022 | Silberman |
| 2022/0126864 | A1 | 4/2022 | Moustafa |
| 2022/0153314 | A1 | 5/2022 | Suo |
| 2022/0318464 | A1 | 10/2022 | Xu |
| 2022/0335624 | A1 | 10/2022 | Maurer |
| 2022/0366494 | A1 | 11/2022 | Cella |

OTHER PUBLICATIONS

Rosique, Francisca, et al. "A systematic review of perception system and simulators for autonomous vehicles research." Sensors 19.3 (2019): 648.*

Aoude, Georges S., et al. "Driver behavior classification at intersections and validation on large naturalistic data set." IEEE Transactions on Intelligent Transportation Systems 13.2 (2012): 724-736. (Year: 2012).*

International Search Report and Written Opinion for PCT/US2021/021878, mailed Jun. 22, 2021, 15 pgs.

Queiroz, Rodrigo et al., "GeoScenario: an Open DSL for Autonomous Driving Scenario Representation", 2019 IEEE Intelligent Vehicles Symposium (IV), Jun. 9-12, 2019, 8 pgs.

Product Marketing, "Autonomous Vehicle Modeling & Simulation", https://simulatemore.mscsoftware.com/ autonomous-vehicle-modeling-simulation/, Jul. 17, 2018, retrieved Jan. 10, 2020, 7 pgs.

Southward, Charles M. II, "Autonomous Convoy Study of Unmanned Ground Vehicles Using Visual Snakes", Master's Thesis Submitted to the Faculty of the Virginia Polytechnic Institute and State University, May 1, 2007, 78 pgs.

Rosique, Francisca et al., "A Systematic Review of Perception System and Simulators for Autonomous Vehicles Research", Sensors 2019, 19, 648; doi:10.3390/s19030648, Feb. 5, 2019, 29 pgs.

International Preliminary Report on Patentability for PCT/US2021/021878, mailed Sep. 22, 2022, 9 pgs.

Communication Pursuant to Rules 161(1) and 162 EPC for European Patent Application No. 21715441.8, dated Oct. 18, 2022, 3 pgs.

Zhu, Meixin, Xuesong Wang, and Yinhai Wang. "Human-like autonomous car-following model with deep reinforcement learning." Transportation research part C: emerging technologies 97 (2018): 348-368. (Year: 2018).

Krajewski, Robert, et al. "The HighD Dataset: A Drone Dataset of Naturalistic Vehicle Trajectories on German Highways for Validation of Highly Automated Driving Systems." 2018 21st International Conference on Intelligent Transportation Systems (ITSC). IEEE, 2018.

* cited by examiner

VALIDATING AUTONOMOUS VEHICLE SIMULATION SCENARIOS

CROSS-REFERENCE TO RELATED APPLICATIONS

This application claims priority to U.S. Provisional Application Ser. No. 62/988,307, filed Mar. 11, 2020, titled "Validating Autonomous Vehicle Simulation Scenarios", which is hereby incorporated herein in its entirety by this reference.

BACKGROUND

A challenge to autonomous vehicle technology arises in training the machine learning models used to navigate and control the autonomous vehicle under a wide variety of driving circumstances. For example, the perception or planning subsystems in an autonomous vehicle need to be trained to process information about the autonomous vehicle's surrounding environment, along with planning and executing commands to appropriately determine the trajectory of the autonomous vehicle through its current environment. Some approaches may use simulation for training the machine learning models. For example, some base simulation data can be restructured and redefined in different ways to generate variations for training the perception and control subsystems of an autonomous vehicle. However, it becomes impractical to manually inspect each simulation variation to observe unwanted behaviors and filter out unwanted examples of simulation data that may bias the machine learning models.

SUMMARY

This specification relates to methods and systems for validating autonomous vehicle simulation scenarios using a simulation validator. According to one aspect of the subject matter described in this disclosure, a method includes executing a simulation based on a simulation scenario, monitoring the execution of the simulation and receiving a first message from the execution of the simulation, determining, by a first simulation validator, whether the first message satisfies a first condition, and validating the simulation scenario responsive to the first message satisfying the first condition to produce validated simulation data.

In general, another aspect of the subject matter described in this disclosure includes a system comprising one or more processors and memory operably coupled with the one or more processors, wherein the memory stores instructions that, in response to the execution of the instructions by one or more processors, cause the one or more processors to perform operations including executing a simulation based on a simulation scenario, monitoring the execution of the simulation and receiving a first message from the execution of the simulation, determining, by a first simulation validator, whether the first message satisfies a first condition, and validating the simulation scenario responsive to the first message satisfying the first condition to produce validated simulation data.

Other implementations of one or more of these aspects include corresponding systems, apparatus, and computer programs, configured to perform the actions of the methods, encoded on computer storage devices.

These and other implementations may each optionally include one or more of the following features. For instance, the method further comprises providing the validated simulation data of the validated simulation scenario as a training input to the machine learning model to generate a predicted output of the machine learning model, and updating one or more weights in the machine learning model based on a difference between the predicted output and the simulated output of the validated simulation scenario. For example, the method may also include one or more of signaling termination of the execution of the simulation in response to determining that the first message does not satisfy the first condition, signaling a success in the execution of the simulation in response to determining the first message satisfies the first condition, signaling a failure in the execution of the simulation in response to determining the first message does not satisfy the first condition, or signaling an advisory message about the execution of the simulation. For instance, features may also include that the simulation scenario is a three-dimensional virtual scene simulating an encounter between the autonomous vehicle and an entity in a surrounding environment of the autonomous vehicle, or the first simulation validator is one from a group of a timer validator, a speed validator, a distance validator, a collision validator, a passenger experience validator, a region validator, a lateral offset validator, a lateral wiggle validator, a traffic light validator, and a reckless driving validator. In general, other aspects of the subject matter of this disclosure may be implemented in methods where a second simulation validator determines whether the second message satisfies a second condition, the first validator and the second validator are a same type, or validating the simulation scenario is responsive to a logical combination of the first message satisfying the first condition and the second message satisfying the second condition. Still other implementations include generating metrics associated with the first simulation validator and the second simulation validator, and storing the metrics in a database, or receiving a plurality of messages from the execution of the simulation representing time series data and buffering the plurality of messages for the first simulation validator.

BRIEF DESCRIPTION OF THE DRAWINGS

These and other aspects and features of the present implementations will become apparent upon review of the following description of specific implementations in conjunction with the accompanying figures, wherein.

DETAILED DESCRIPTION

Overview

In the following disclosure, a simulation validation system 160 is used to validate simulation scenarios and the validated simulation data from validated simulation scenarios is used to train one or more machine learning models for autonomous control of an autonomous vehicle. The machine learning models may be used in an autonomous vehicle for performing various autonomous vehicle tasks including perception, planning, and other tasks. An appropriate dataset of quality training data is needed to train the machine learning models. For example, autonomous vehicle tasks may include control signals indicating a route change action, a planning action, and/or other autonomous vehicle actions which are generated in response to data collected from one or more autonomous vehicle sensors. Waiting for training data to be gathered for autonomous vehicle tasks from the operation of vehicles in the real world takes extended periods of time (e.g., weeks, months, etc.). Beyond the issue that real logged sensor data is limited, another particular issue with using real logged sensor data for training machine learning models is that it may include more noise than data from other sources like video game engines or video/film data. Alternatively, training data for a variety of autonomous vehicle tasks may be generated using a set of base simulation scenarios. For example, a simulation scenario may describe a three-dimensional scene (e.g., a virtual scene) that simulates the behavior, properties, and sensor configuration of the autonomous vehicle in a specific encounter with the environment including other vehicles (autonomous and/or non-autonomous) at rest or motion, pedestrians, time of day, weather conditions, terrain, and road surface markings, among other things. A base set of simulation scenarios may be used to generate thousands of variations for obtaining a sufficient quantity of training examples. However, such variations of simulation scenarios do not always translate to good training examples. It is impractical to manually inspect and filter each of these simulation scenarios for unwanted behavior or incidents. It is important that the machine learning models are not biased with unwanted training examples, particularly with respect to autonomous control of a vehicle in a dynamic environment with both static and moving obstacles. Therefore, the present disclosure is particularly advantageous because it provides a system and method for filtering out noise and validating simulation data whether it be generated from real logged sensor data, from simulators similar to video games, from film or video data, or any combination of these.

Autonomous Vehicle

Figure 1:
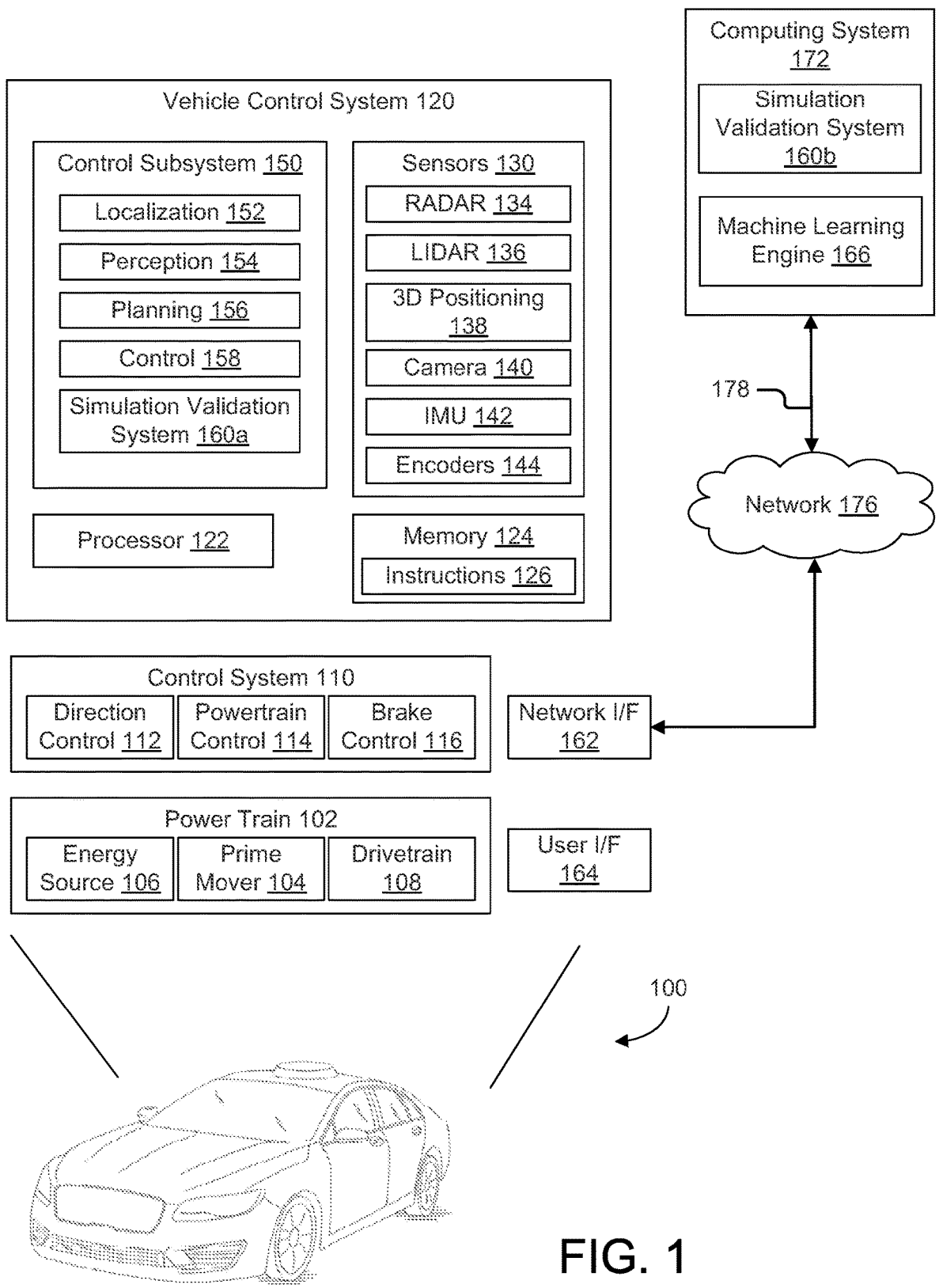
FIG. 1 is a block diagram illustrating an example hardware and software environment for an autonomous vehicle according to some implementations.

Referring to the drawings, wherein like numbers denote like parts throughout the several views, FIG. 1 illustrates an example hardware and software environment for an autonomous vehicle within which various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling by land, by sea, by air, underground, undersea, and/or in space, and it will be appreciated that the aforementioned components 102-116 may vary widely based upon the type of vehicle within which these components are utilized.

For simplicity, the implementations discussed hereinafter will focus on a wheeled land vehicle such as a car, van, truck, bus, etc. In such implementations, the prime mover 104 may include one or more electric motors and/or an internal combustion engine (among others). The energy source 106 may include, for example, a fuel system (e.g., providing gasoline, diesel, hydrogen, etc.), a battery system, solar panels or other renewable energy source, and/or a fuel cell system. The drivetrain 108 includes wheels and/or tires along with a transmission and/or any other mechanical drive components suitable for converting the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some implementations, multiple electric motors (e.g., dedicated to individual wheels or axles) may be used as a prime mover. In the case of a hydrogen fuel cell implementation, the prime mover 104 may include one or more electric motors and the energy source 106 may include a fuel cell system powered by hydrogen fuel.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to airplanes, space vehicles, helicopters, drones, military vehicles, all-terrain or tracked vehicles, ships, submarines, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, full or semi-autonomous control over the vehicle 100 is implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle 100. For example, sensors 130 can include RADAR sensor 134, LIDAR (Light Detection and Ranging) sensor 136, a 3D positioning sensor 138, e.g., a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can optionally include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle 100 in three directions. One or more encoders 144, such as wheel encoders may be used to monitor the rotation of one or more wheels of vehicle 100.

The outputs of sensors 130 may be provided to a set of control subsystems 150, including, a localization subsystem 152, a perception subsystem 154, a planning subsystem 156, and a control subsystem 158. The localization subsystem 152 is principally responsible for precisely determining the location and orientation (also sometimes referred to as "pose") of the vehicle 100 within its surrounding environment, and generally within some frame of reference. The perception subsystem 154 is principally responsible for detecting, tracking, and/or identifying objects within the environment surrounding vehicle 100. A machine learning model in accordance with some implementations can be utilized in tracking objects. The planning subsystem 156 is principally responsible for planning a trajectory or a path of motion for vehicle 100 over some timeframe given a desired destination as well as the static and moving objects within the environment. A machine learning model in accordance with some implementations can be utilized in planning a vehicle trajectory. The control subsystem 158 is principally responsible for generating suitable control signals for controlling the various controls in the vehicle control system 120 in order to implement the planned trajectory of the vehicle 100. Similarly, a machine learning model can be utilized to generate one or more signals to control the autonomous vehicle 100 to implement the planned trajectory.

In addition, a simulation validation system 160a may be included as part of the control subsystems 150 (or more generally as part of the vehicle control system 120) in one implementation to validate a simulation scenario to be used in training one or more machine learning models of the autonomous vehicle 100. As will be discussed in greater detail below, the simulation validation system 160a may provide validated simulation data to train or optimize the machine learning models corresponding to each of the localization, planning, perception, and control subsystems 152-158 for use in performing their respective functions.

It will be appreciated that the collection of components illustrated in FIG. 1 for the vehicle control system 120 is merely one example. Individual sensors may be omitted in some implementations. Additionally, or alternatively, in some implementations, multiple sensors of the same types illustrated in FIG. 1 may be used for redundancy and/or to cover different regions around a vehicle. Moreover, there may be additional sensors beyond those described above to provide actual sensor data related to the operation and environment of the wheeled land vehicle. Likewise, different types and/or combinations of control subsystems may be used in other implementations. Further, while subsystems 152-160 are illustrated as being separate from processor 122 and memory 124, it will be appreciated that in some implementations, some or all of the functionality of a subsystem 152-160 may be implemented with program code instructions 126 resident in one or more memories 124 and executed by one or more processors 122, and that these subsystems 152-160 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors 122 illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 176 to permit the communication of information with other computers and electronic devices, including, for example, a central service, such as a cloud service, from which the vehicle 100 receives information including trained machine learning models and other data for use in autonomous control thereof. The one or more networks 176, for example, may be a communication network that includes a wide area network ("WAN") such as the Internet, one or more local area networks ("LANs") such as Wi-Fi LANs, mesh networks, etc., and one or more bus subsystems. The one or more networks 176 may optionally utilize one or more standard communication technologies, protocols, and/or inter-process communication techniques. In some implementations, data collected by the one or more sensors 130 can be uploaded to a computing system 172 via the network 176 for additional processing.

In the illustrated implementation, the vehicle 100 may communicate via the network 176 with a computing device 172 for the purposes of implementing various functions described below for simulation validation and the generation of machine learning models. In some implementations, computing device 172 is a cloud-based computing device. As described below in more detail with reference to FIG. 2, the computing device 172 includes a simulation validation system 160b and a machine learning engine 166. In some implementations, the simulation validation system 160 may be configured and executed on a combination of the computing system 172 and the vehicle control system 120 of the vehicle 100. For example, the simulation validation system 160a may execute some functionality on the vehicle control system 120 of the vehicle 100 while the simulation validation system 160b executes the remaining functionality on the computing system 172. In other implementations, either the computing system 172 or the vehicle control system 120 of the vehicle 100 alone executes the functionality of the simulation validation system 160. For example, in some implementations, the simulation validation system 160b operates on the computing system 172 to execute a simulation of a simulation scenario, validate the simulation scenario, and provide the validated simulation scenario to a machine learning engine 166. The machine learning engine 166, operable on the computing system 172, generates a machine learning model based on the validated simulation scenario for use in autonomous control of the vehicle 100. The machine learning model is sent from the computing system 172 to vehicle 100 to be used in the appropriate control subsystem 152-158 for use in performing its respective function. In alternate implementations, the simulation validation system 160a and the machine learning engine (not shown) operate on vehicle 100 to validate the simulation scenario, generate a machine learning model based on the validated simulation scenario, and add the new machine learning model to the appropriate control subsystem 152-158 for use in performing its respective function.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer (e.g., computing system 172) coupled to vehicle 100 via network 176, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program codes described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The example environment illustrated in FIG. 1 is not intended to limit implementations disclosed herein. Indeed, other alternative hardware and/or software environments may be used without departing from the scope of implementations disclosed herein.

Simulation Validation System

Figure 2:
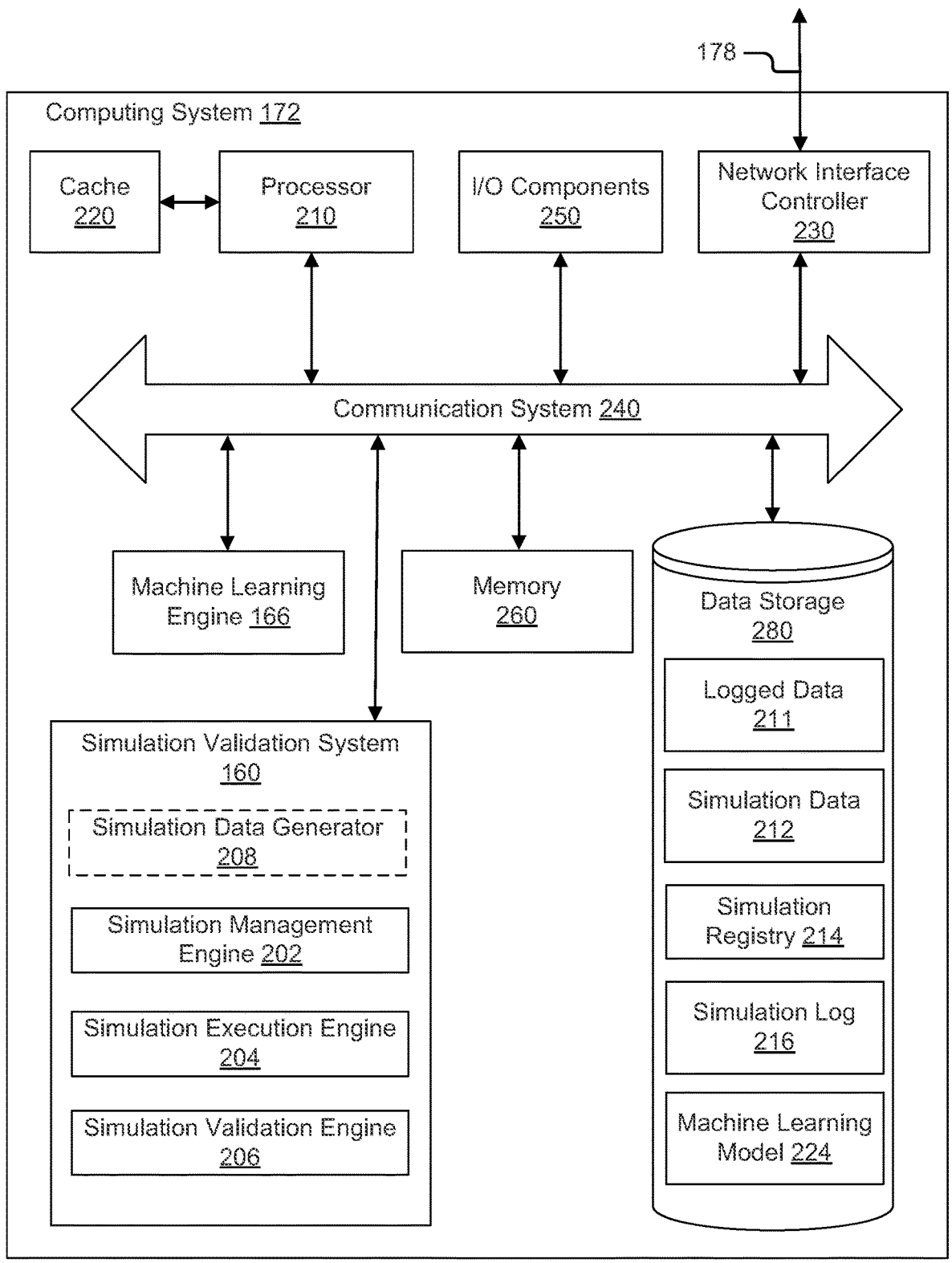
FIG. 2 is a block diagram illustrating an example computing system for validating simulation scenarios used in training a machine learning model according to some implementations.

FIG. 2 is a block diagram illustrating an example of a computing system 172 for validating simulation scenarios used in training a machine learning model according to some implementations.

Referring to FIG. 2, the illustrated example computing system 172 includes one or more processors 210 in communication, via a communication system 240 (e.g., bus), with memory 260, at least one network interface controller 230 with network interface port for connection to a network (e.g., network 176 via signal line 178), a data storage 280, and other components, e.g., an input/output ("I/O") components interface 250 connecting to a display (not illustrated) and an input device (not illustrated), a simulation validation system 160, and a machine learning engine 166. Generally, the processor(s) 210 will execute instructions (or computer programs) received from memory 260. The processor(s) 210 illustrated incorporate, or are directly connected to, cache memory 220. In some instances, instructions are read from memory 260 into the cache memory 220 and executed by the processor(s) 210 from the cache memory 220.

In more detail, the processor(s) 210 may be any logic circuitry that processes instructions, e.g., instructions fetched from the memory 260 or cache 220. In some implementations, the processor(s) 210 are microprocessor units or special purpose processors. The computing device 172 may be based on any processor, or set of processors, capable of operating as described herein. The processor(s) 210 may be a single core or multi-core processor(s). The processor(s) 210 may be multiple distinct processors.

The memory 260 may be any device suitable for storing computer readable data. The memory 260 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 172 may have any number of memory devices as the memory 260. While the simulation validation system 160 and the machine learning engine 166 are illustrated as being separate from processor 210 and memory 260, it will be appreciated that in some implementations, some or all of the functionality of the components 160 and 166 may be implemented with program code instructions resident in the memory 260 and executed by the processor 210.

The cache memory 220 is generally a form of computer memory placed in close proximity to the processor(s) 210 for fast read times. In some implementations, the cache memory 220 is part of, or on the same chip as, the processor(s) 210. In some implementations, there are multiple levels of cache 220, e.g., L2 and L3 cache layers.

The network interface controller 230 manages data exchanges via the network interface (sometimes referred to as network interface ports). The network interface controller 230 handles the physical and data link layers of the OSI model for network communication. In some implementations, some of the network interface controller's tasks are handled by one or more of the processors 210. In some implementations, the network interface controller 230 is part of a processor 210. In some implementations, a computing system 172 has multiple network interfaces controlled by a single controller 230. In some implementations, a computing system 172 has multiple network interface controllers 230. In some implementations, each network interface is a connection point for a physical network link (e.g., a cat-5 Ethernet link). In some implementations, the network interface controller 230 supports wireless network connections and an interface port is a wireless (e.g., radio) receiver/transmitter (e.g., for any of the IEEE 802.11 protocols, near field communication "NFC", Bluetooth, ANT, WiMAX, 5G, or any other wireless protocol). In some implementations, the network interface controller 230 implements one or more network protocols such as Ethernet. Generally, a computing device 172 exchanges data with other computing devices via physical or wireless links (represented by signal line 178) through a network interface. The network interface may link directly to another device or to another device via an intermediary device, e.g., a network device such as a hub, a bridge, a switch, or a router, connecting the computing device 172 to a data network such as the Internet.

The data storage 280 may be a non-transitory storage device that stores data for providing the functionality described herein. The data storage 280 may store, among other data, logged data 211, simulation data 212, a simulation registry 214, a simulation log 216, and a machine learning model or representation 224, as will be defined below.

The computing system 172 may include, or provide interfaces for, one or more input or output ("I/O") devices 250. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers. Other components may include an I/O interface, external serial device ports, and any additional co-processors. For example, a computing system 172 may include an interface (e.g., a universal serial bus (USB) interface) for connecting input devices, output devices, or additional memory devices (e.g., portable flash drive or external media drive). In some implementations, a computing device 172 includes an additional device such as a co-processor, e.g., a math co-processor can assist the processor 210 with high precision or complex calculations.

In implementations consistent with the disclosure, the simulation validation system 160 is utilized to validate the self driving control subsystem 150 of the autonomous vehicle 100. More specifically, the present disclosure is directed to validating the correctness of simulation scenarios and data (e.g., for behavior of the motion planner 156) before they are used in training the machine learning models for performing various autonomous vehicle tasks. In some implementations, the simulation validation system 160 includes a simulation data generator 208, a simulation management engine 202, a simulation execution engine 204, and a simulation validation engine 206. The simulation data generator 208, the simulation management engine 202, the simulation execution engine 204, and the simulation validation engine 206 of the simulation validation system 160 and separately the machine learning engine 166 are example components in which the techniques described herein may be implemented and/or with which systems, components, and techniques described herein may interface. While described in the context of the computing system 172, it should be understood that the operations performed by one or more components 202, 204, 206, 208, and 166 of FIG. 2 may be distributed across multiple computing systems. In some implementations, one or more aspects of components 202, 204, 206, 208, and 166 may be combined into a single system and/or one or more aspects may be implemented by the computing system 172. For example, in some implementations, aspects of the simulation management engine 202 may be combined with aspects of the simulation execution engine 204. In another example, aspects of simulation validation engine 206 may be combined with aspects of the machine learning engine 166. Engines in accordance with many implementations may each be implemented in one or more computing devices that communicate, for example, through the communication network 176. In the example implementation of FIG. 2, the simulation data generator 208 is shown in dashed lines within the simulation validation system 160 to indicate that it is an optional component.

In some implementations, the simulation data generator 208 may receive vehicle logged data collected during a driving session of an autonomous vehicle. For example, vehicle data may be collected by the one or more sensors 130 and be uploaded to the computing system 172 via the network 176. In some implementations, a time stamp may be added to each instance of vehicle logged data prior to the uploading and the time stamped vehicle data may be stored as logged data 211 for later use. The logged data 211 may include time series log data, such as localization data, tracking data, and optionally include other vehicle sensor data and environmental data. For example, during a driving session of an autonomous vehicle, data is collected by the vehicle control subsystem 150 at different points in time of the drive along with a record of when the data was acquired. As an example, each instance of time series log data may include a current location, orientation, and speed of the autonomous vehicle based on the localization data. The tracking data may include tracking of objects external to the autonomous vehicle describing their position(s), extent(s), orientation(s) categories, speed(s), and other tracking data or tracking predictions. Information on static objects (e.g., highway signs, lane markings, road surfaces, etc.) may also be logged. In some implementations, other forms of environmental data may also be logged (e.g., weather conditions, lighting conditions, visibility, etc.).

In some implementations, the simulation data generator 208 may convert the log data accessible in the logged data 211 in different ways to generate simulation data 212. For example, the log data is used as a source of data that is based on ground level truth about real world driving situations to generate simulation data 212. In many implementations, the simulation data 212 represents an editable source of truth defining a number of simulation scenarios. In some implementations, one or more components of an instance of the log data are used to aid in creating at least one aspect of a simulation scenario. For example, in some implementations, the log data is used as an aid to generate a description including a behavior, vehicle configuration (e.g., autonomous vehicle location, platform, speed, or orientation), and sensor configuration of autonomous vehicle (e.g., ego vehicle) and the environment including actors (e.g., other vehicles, traffic, pedestrians, and static objects) in a simulation scenario. However, more generally, in some implementations, other information available from the log data may be used as an aid in generating a simulation scenario. The log data may be generally used, in some implementations, as a resource to provide a source of real sensor data for a simulation task that requires a source of real sensor data.

The simulation management engine 202 may access, process, and manage the simulation data 212. The simulation management engine 202 accesses a base simulation scenario in the simulation data 212 and converts the base simulation scenario into a plurality of simulation scenarios. For example, the simulation management engine 202 may use a parameter sweep to adjust a value of a parameter in a base simulation scenario through a defined range and generate configurations for a plurality of varying simulation scenarios. In another example, the simulation management engine 202 may use Monte Carlo sampling method for randomly sampling a value of a parameter in a base simulation from a probability distribution and generate configurations for a variety of simulation scenarios. As an example, changing the parameters in the base simulation scenario may include changing one or more configuration values of a vehicle platform parameter, a mapping parameter, a start gate, a start speed, actor (e.g., bicycle, pedestrian, etc.) placement, environmental parameter, or other autonomy parameters. In some implementations, when variations to the simulation scenarios are used to generate a plurality of simulation scenarios as described above, it may introduce unwanted behaviors or noise in the plurality of simulation scenarios.

The simulation management engine 202 may register a simulation scenario by generating a simulation identifier, assigning the simulation identifier to the simulation scenario, and storing the simulation scenario in the simulation registry 214 indexed by the simulation identifier. For example, the simulation identifier may be a globally unique identifier (GUID). The simulation registry 214 may be a database storing currently and previously available simulation scenarios indexed by their corresponding simulation identifiers. The simulation management engine 202 may process a simulation scenario and derive a simulation tag to associate with the simulation scenario in the simulation registry 214. For example, the simulation tag may be based on one or more of a geography (e.g., San Francisco, New York, etc.), actors (e.g., other vehicles, bicycles, pedestrians, mobility scooters, motorized scooters, etc.), behaviors (e.g., lane change, merge, steering, etc.), location (e.g., four-way stop, intersection, ramp, etc.), status (e.g., deprecated, quarantined, etc.), vehicle make and model, sensor configurations, etc. The simulation management engine 202 may also receive one or more user annotations for a simulation tag to associate with a simulation scenario. For example, a simulation scenario may be a project milestone and manually tagged by a user. The simulation tag makes it easier to query the simulation registry 214 and select a simulation scenario. The simulation scenarios may also be categorized in the simulation registry 214 by the simulation tags. In some implementations, the simulation management engine 202 provides a user interface to query the simulation registry 214 for selecting one or more simulation scenarios to run in a simulation. For example, the query may include one or more phrases, such as "has pedestrians," "in Pittsburgh," "intersection," etc. The simulation management engine 202 matches the query with the simulation tags associated with the simulation scenarios and retrieves the matching simulation scenarios from the simulation registry 214.

The simulation execution engine 204 may execute a simulation based on a selected simulation scenario. For example, the simulation scenario may correspond to a perception simulation scenario or a planning simulation scenario. In some implementations, the simulation management engine 202 sends a simulation identifier to the simulation execution engine 204. The simulation execution engine 204 uses the simulation identifier to fetch a configuration of a matching simulation scenario from the simulation registry 214 and executes a simulation based on the fetched simulation scenario configuration. The simulation execution engine 204 may create a run identifier (run ID) to associate with an execution (run) of the simulation. In some implementations, the simulation execution engine 204 may create a batch of a plurality of simulation scenario variations and execute the batch in a single execution. In such implementations, the simulation execution engine 204 may create a batch identifier (batch ID) to associate with the batch execution. The simulation execution engine 204 may generate a simulation result and/or a simulation log during the execution of the simulation and store it in the simulation log 216. In some implementations, the simulation result and/or a simulation log are one or more formatted messages including or encoded with state information of the autonomous vehicle 100 and other actors observed in the simulation. For example, the messages exchanged between the simulation execution engine 204 and the simulation validation engine 206 may be serialized for exchange in a protocol buffer format. The simulation log 216 may be a database storing a historical log of simulation runs indexed by corresponding run ID and/or batch ID. In one implementation, the simulation execution engine 204 sends one or more formatted messages reflecting conditions in the scenario in real time during execution of the simulation based on the simulation scenario to the simulation validation engine 206. The simulation execution engine 204 may also be configured to terminate the execution of the simulation based on instructions received from the simulation validation engine 206 described in detail below.

The simulation validation engine 206 may monitor execution of the simulation by the simulation execution engine 204 and validate the corresponding simulation scenarios. The simulations often have many different modules and during execution each of the modules generates and sends several messages with state information about the simulation execution. The execution of the simulation by the simulation execution engine 204 may be configured to forward the messages to the simulation validation engine 206 for processing in real time or with some amount of predetermined latency. The simulation execution engine 204 cooperates and communicates with the simulation validation engine 206 using Inter Process Communication (IPC) mechanism. IPC enables the passing of messages to be asynchronous. In another implementation, the simulation validation engine 206 may process simulation result and/or a simulation log 216 after the simulation has executed. The simulation validation engine 206 processes the messages and automatically detects one or more incidents during the execution of the simulation. An incident is a behavior or group of conditions that is defined by one or more simulation validators as will be described below. For example, the incidents may include unwanted behaviors of the autonomous vehicle in the simulation. In some implementations, the simulation validation engine 206 may take different actions in response to the identification of the unwanted or undesirable behavior through an incident being detected. For example, actions include: a) identifying an unwanted or undesirable behavior in the simulation currently executing; b) instructing the simulation execution engine 204 to terminate execution; c) sending a warning or advisory message or notification of the incident to other systems; d) marking or excluding the simulation from used in machine learning training, or e) any combinations of these actions. The presence of unwanted behavior in the simulation often disqualifies the corresponding simulation scenario and its simulation data for use in training the machine learning model 224 of the autonomous vehicle 100. For example, unwanted behavior of the autonomous vehicle 100 in the simulation may include on-coming lane intrusion; increased braking and/or acceleration; collision; failure to yield; speeding; other impossible locations, impossible pose or impossible motion of the autonomous vehicle 100, etc. The simulation validation engine 206 may discard the simulation scenario in response to detecting one or more incidents of unwanted behavior in a simulation run of the simulation scenario. For example, the simulation scenario and its simulation data are not used for training the machine learning model 224 of the autonomous vehicle 100. In some implementations, the negative or failed training examples may be marked as such and provided to as a training signals to the machine learning model of unwanted behaviors, and thereby used to improve the precision of the machine learning model. The simulation validation engine 206 may generate and store validation results associated with validating the simulation scenario in the simulation log 216. In some implementations, the simulation management engine 202 analyzes the validation results and identifies the unwanted incidents or other interesting behaviors observed in the simulation scenario. The simulation management engine 202 may map back the analysis of validation results to the simulation data 212 to edit out or remove the unwanted incident as noise and reconfigure a variation of the simulation scenario. The edited simulation scenario may be executed again in a simulation by the simulation execution engine 204 and validated by the simulation validation engine 206. Example implementations of the simulation validation engine 206 will be described in more detail below with reference to FIGS. 3A and 3B.

As shown in FIG. 2, once the simulation validation system 160 has validated the simulation scenarios as suitable for training the machine learning model 224, the machine learning engine 166 may train the machine learning model 224 using the validated simulation scenarios as training examples. In one implementation, the machine learning model 224 is a neural network model and includes a layer and/or layers of memory units where memory units each have corresponding weights. A variety of neural network models can be utilized including feed forward neural networks, convolutional neural networks, recurrent neural networks, radial basis functions, other neural network models, as well as combinations of several neural networks. Additionally, or alternatively, the machine learning model 224 can represent a variety of machine learning techniques in addition to neural networks, for example, support vector machines, decision trees, Bayesian networks, random decision forests, k-nearest neighbors, linear regression, least squares, other machine learning techniques, and/or combinations of machine learning techniques.

Machine learning models 224 may be trained for a variety of autonomous vehicle tasks including determining a target autonomous vehicle location, generating one or more signals to control an autonomous vehicle, tracking or identifying objects within the environment of an autonomous vehicle, etc. For example, a neural network model may be trained to identify traffic lights in the environment with the autonomous vehicle 100. As a further example, a neural network model may be trained to predict the make and model of other vehicles in the environment with the autonomous vehicle 100. In many implementations, neural network models may be trained to perform a single task. In other implementations, neural network models may be trained to perform multiple tasks.

The machine learning engine 166 may generate training instances from the validated simulation scenarios to train the machine learning model 224. A training instance can include, for example, an instance of simulated autonomous vehicle data where the autonomous vehicle 100 can detect a stop sign using the simulated sensor data from one or more sensors and a label corresponding to a simulated output corresponding to bringing the autonomous vehicle to a stop in the simulation scenario. The machine learning engine 166 may apply a training instance as input to machine learning model 224. In some implementations, the machine learning model 224 may be trained using any one of at least one of supervised learning (e.g., support vector machines, neural networks, logistic regression, linear regression, stacking, gradient boosting, etc.), unsupervised learning (e.g., clustering, neural networks, singular value decomposition, principal component analysis, etc.), or semi-supervised learning (e.g., generative models, transductive support vector machines, etc.). Additionally, or alternatively, machine learning models in accordance with some implementations may be deep learning networks including recurrent neural networks, convolutional neural networks (CNN), networks that are a combination of multiple networks, etc. For example, the machine learning engine 166 may generate a predicted machine learning model output by applying training input to the machine learning model 224. Additionally, or alternatively, the machine learning engine 166 may compare the predicted machine learning model output with a machine learning model known output (e.g., simulated output in the simulation scenario) from the training instance and, using the comparison, update one or more weights in the machine learning model 224. In some implementations, one or more weights may be updated by backpropagating the difference over the entire machine learning model 224.

The machine learning engine 166 may test a trained machine learning model according to some implementations. The machine learning engine 166 may generate testing instances using the validated simulation scenario and the simulated autonomous vehicle in the simulation scenario performing the specific autonomous vehicle task for which the machine learning model 224 is trained. The machine learning engine 166 may apply a testing instance as input to the trained machine learning model 224. A predicted output generated by applying a testing instance to the trained machine learning model 224 may be compared with a known output for the testing instance (i.e., a simulated output observed in the simulation) to update an accuracy value (e.g., an accuracy percentage) for the machine learning model 224.

Simulation Monitors

Figure 3A:
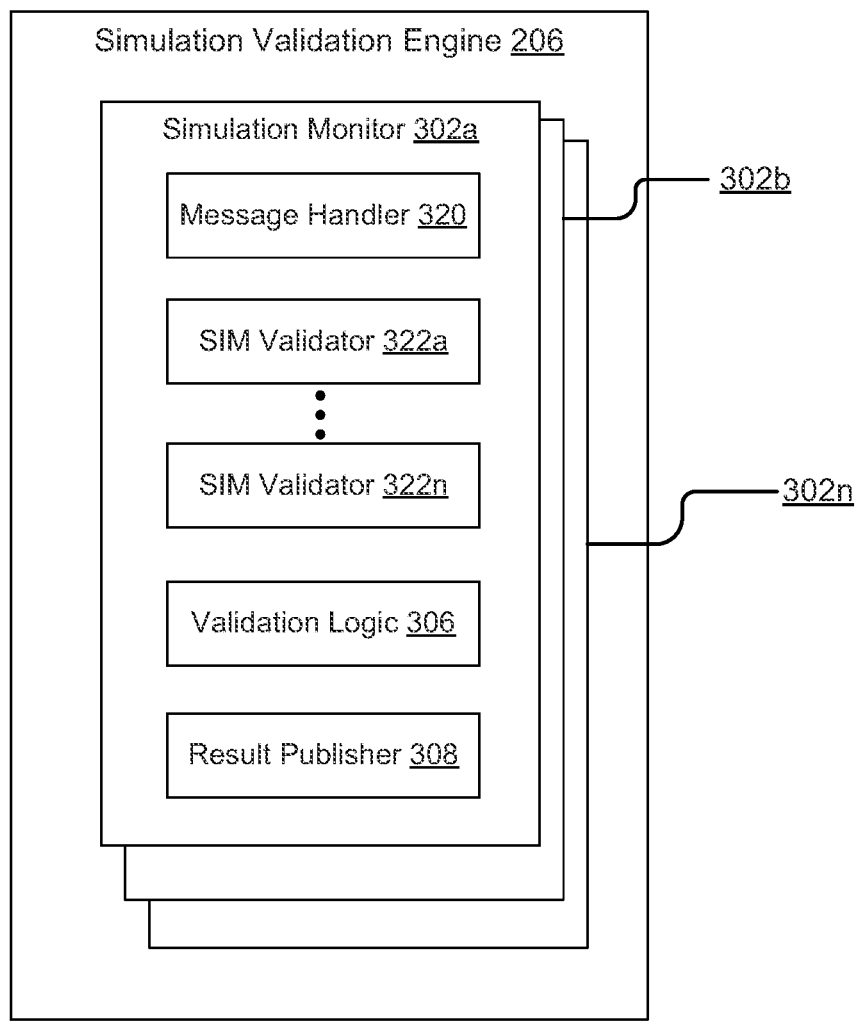
FIGS. 3A and 3B are block diagrams illustrating example implementations of a simulation validation engine referenced in FIG. 2.

Referring now to FIG. 3A, an example implementation of the simulation validation engine 206 is illustrated in greater detail. In this implementation, the simulation validation engine 206 includes one or more simulation monitors 302a, 302b . . . 302n. Each of the simulation monitors 302a, 302b . . . 302n automatically detects a respective incident from execution of the simulation. This implementation represents a basic configuration and detections of different incidents by each simulation monitor 302a, 302b . . . 302n are independent from each other, and individually output by the simulation validation engine 206. The simulation validation engine 206 tunes to the plurality of messages broadcast by the simulation execution engine 204. In this implementation, each of the one or more simulation monitors 302a, 302b . . . 302n receives the messages broadcast by the simulation execution engine 204. Each simulation monitor 302 performs automatic incident detection during the execution of the simulation by the simulation execution engine 204.

In this implementation, each simulation monitor 302 includes a message handler 320, one or more simulation (SIM) validators 322a . . . 322n, validation logic 306, and a result publisher 308 as shown in FIG. 3A.

The message handler 320 receives the messages broadcast by the simulation execution engine 204 and identifies which messages should be sent to which simulation validators 322 and for each message either discards it or sends it to the one or more simulation validators 322a . . . 322n. For example, a particular message may not be related to the condition being confirmed or validated by any of one or more simulation validators 322a . . . 322n so it is discarded. Another message may only be used for validating the condition of a first simulation validator 322a so that message is sent to the first simulation validator 322a and not the other simulation validators 322b . . . 322n. Yet another message may only be used for validating a condition of a second and a third simulation validators 322b, 322c so that message is sent to only to the second and third simulation validators 322b, 322c and not the first simulation validator 322a and the other simulation validators 322d . . . 322n. From the above examples, it should be understood that the message handler 320 receives messages broadcast by the simulation execution engine 204, and for each message: a) discards it, b) sends it to a particular simulation validator 322 or c) sends it to a set of two or more simulation validators 322; thereby, effectively filtering the messages and sending them to the simulation validators 322 that need them to test or validate particular conditions. For example, the message handler 320 may identify messages as belonging to a first set and send the first set of messages to a first simulation validator 322a, and identify messages as belonging to a second set and send the second set of messages to a second simulation validator 322b, and so on for each simulation validator 322 in a simulation monitor 302. The message handler 320 may also include one or more buffers to store messages. The buffers may be part of the simulation validators 322 as will be described in more detail below. The messages may correspond to a time series of messages originating during an execution of one or more simulations. In some implementations, the message handler 320 buffers the time series of messages in one or more buffers and sends them to one or more simulation validators 322a . . . 322n. In some implementations, one or more simulation validators 322a . . . 322n may correspond to the frequency at which validation is performed by the simulation monitor 302. In general, the one or more simulation validators 322a . . . 322n are assumed to be operating in parallel with the messages passed to each simulation validator 322a . . . 322n as appropriate as the messages are received. However, in other implementations, the message handler 320 may prioritize one simulation validator 322a over others by sending the messages first to that one simulation validator 322a before sending them to others after a predetermined amount of buffering delay time. In some implementations, one or more simulation validators 322a . . . 322n may process the time series data up until a certain point in time (latching point) or a certain condition is satisfied, and ignore messages afterwards, based on the time series up to that time.

Each simulation validator 322 may be configured with a validation condition. Each simulation validator 322 receives one or more messages from the message handler 320 and performs a validation check on the received messages. In some implementations, the simulation validator 322 may include one or more buffers to buffer the received messages in contrast to the message handler 320. The validation check performed by a simulation validator 322 determines whether a value of the message satisfies the constraints specified by a validation condition. The components of the validation condition may use Boolean operators or operators, such as '=,' '>,' "=>' '<=', and '<.' The Boolean and other operators may be binary (e.g., two operands), but need not necessarily require binary operators, e.g., a<=x<=b, or (x AND y AND z). Each simulation validator 322 generates a status message indicating whether the validation check on the processed message was successful (pass) or not (fail) and sends the status message to the validation logic 306. In other words, each simulation validator 322 verifies whether its condition has been satisfied.

The validation logic 306 is coupled to and receives the status messages or other signals from each simulation validator 322 in its simulation monitor 302. The validation logic 306 allows grouping or logical combination of the individual validation condition of each of the plurality of validators 322 to represent an incident. The validation logic 306 signals whether the incident has been detected or not. In other words, the validation logic 306 determines whether it has received status messages for each validation check in the logical combination of validation conditions from the individual simulation validators 322, whether the logical combination of validation conditions are satisfied based on those status messages; and if so, indicates or signals that the incident has been detected. The incidents include: a) a termination incident, b) a success or failure incident, and c) a warning or advisory incident. In some implementations, the incidents are orthogonal to each other and the validation logic 306 generates, based on the status messages input and the conditions validated, one signal for each incident that is validated. For example, the validation logic 306 could signal multiple incidents such as failure of one incident, success of a second incident, and a warning related to a third incident. A specific example of this implementation including different conditions and combinations, will be described below. In other implementations, the validation logic 306 determines and sends a signal or message of either a) a termination incident; b) a success incident; c) a success with an advisory incident; d) a failure incident; e) a failure with an advisory incident; or f) a warning or advisory incident for all the conditions being validated by the simulation monitor 302. It should be noted that the termination incident can also be orthogonal to failure or success in some cases. It should be understood that each simulation monitor 302a-302n may include validation logic 306 that generates one or more incident validation signals for the set of conditions being validated.

In some implementations, the validation logic 306 may send instructions to other components of the system 172 to perform actions based on the detection of an incident. In other implementations, the validation logic 306 notifies the result publisher 308, as will be described below, and the result publisher 308 communicates and controls the other components of the system 172 to perform actions based on the detection of an incident. Examples of actions include: a) identifying or warning that an unwanted or undesirable behavior in the simulation that is currently executing; b) instructing the simulation execution engine 204 to terminate execution; c) sending a warning or advisory message or notification of the incident to other systems; d) marking or excluding the simulation from use in machine learning training, or e) any combinations of these actions. In one example implementation, the validation logic 306 instructs the simulation execution engine 204 to terminate the simulation with a classification of a success or a failure based on the validation check of the received messages, and sends a message including additional information (e.g., text string) describing a fact connected with the termination of the simulation, or including the status message received from the simulation validators 322. For example, the validation logic 306 may perform any one or more of the actions based on a single simulation validator 322 output, or the validation logic 306 may also perform any one or more of the actions based on a multiple simulation validator 322 outputs that are combined in any mathematical or Boolean logic way.

The specific example of validation logic 306 for a simulation monitor 302 that handles incidents orthogonally will now be described. In this example of validation logic 306, there are seven different simulation validators 322 with identifiers V1 to V7 as shown below in Table I.

TABLE I

| Registered validators | | |
|---|---|---|
| Validator Type | Validator ID | Validation Condition |
| Checklist | V1 | |
| Collision | V2 | |
| Timer | V3 | $t \geq 90$ s |
| Distance | V4 | outbounds: ! 100 m $\leq$ x $\leq$ 120 m |
| Timer | V5 | $t \geq 80$ s |

TABLE I-continued

| Registered validators | | |
|---|---|---|
| Validator Type | Validator ID | Validation Condition |
| Speed | V6 | s > 10 m/s |
| Gate Reached | V7 | gate 05ceaaf79-bdd8-49aa-816c-283b344167cd |

The logical combinations of the different simulation validators 322 represented by each row are shown in Table 11 below. Table II also shows an example set of logical combinations of validation conditions for the incidents and the corresponding action(s) for the incidents including terminating a simulation (column 3), signaling failure of a simulation (column 4), and signaling success of a simulation with warnings (column 5).

TABLE II

| | Conditions | | |
|---|---|---|---|
| Validator IDs | Terminate | Fail | Warn |
| V1 | True | True | |
| V2 | True | True | |
| V3 | True | | |
| V3, V4 | | True | |
| V5, V6 | | | True |
| V7 | | True | |

The validation logic 306 determines the incidents present from an execution of a simulation based on the set of logical combinations of conditions validated using the signals from the one or more simulation validators 322a . . . 322n. In one example, the validation logic 306 determines whether a logical combination of validation conditions associated with terminating a simulation is satisfied based on the signals from the one or more simulation validators 322a . . . 322n, and sends instructions to the simulation execution engine 204 to terminate the simulation accordingly. In another example, the validation logic 306 determines whether a logical combination of validation conditions associated with generating warnings in a simulation is satisfied based on the signals from the one or more simulation validators 322a . . . 322n during execution, and sends a warning as specified. In yet another example, the validation logic 306 determines whether a logical combination of validation conditions associated with failing a simulation is satisfied based on the signals from the one or more simulation validators 322a . . . 322n, and classifies the simulation run as a failure, and appends the failure to a list of simulation failures. In some implementations, the validation logic 306 may be configured to prioritized one simulation validator 322 over others. Continuing the example above, the rows of the conditions in Table II may be processed by the validation logic 306 from first row to last row as an example of prioritization.

As shown in Tables I and II, the validation logic 306 terminates a simulation if (a) there is a checklist error, (b) there is a detection of collision, or (c) the timer t≥90 s. The validation logic 306 will fail a simulation if (a) there is a checklist error, (b) there is a detection of collision, (c) the timer t≥90 s and the distance is not between 100 m and 120 m, or (d) a gate is reached at any time in the execution of the simulation. The validation logic 306 will log warnings for a simulation if the speed is above 10 m/s after timer t≥80 s. The logical combination of validation conditions for terminating a simulation, failing a simulation, and generating warnings in a simulation are independent of each other. It will be appreciated that the above description of the validation logic 306 is merely one example, and that the validation logic 306 may be configured to process any logical combination of validation conditions grouped together by any combination of simulation validators 322.

In some implementations, the result publisher 308 receives the output of the validation logic 306 and publishes an incident validation result as one or more of: a termination incident, a success incident, a failure incident, or a success with warning incident. In such implementations, the result publisher 308 communicates with the other components of the system 172 to perform the actions based on the incident validation result. As has been noted above, the actions may include: a) identifying an unwanted or undesirable behavior in the simulation currently executing; b) instructing the simulation execution engine 204 to terminate execution; c) sending a warning or advisory message of the incident to other systems; d) marking or excluding the simulation from used in machine learning training, or e) any combinations of these actions. The result publisher 308 may communicate with the simulation execution engine 204 to terminate the simulation, communication with the simulation log 216 or the simulation registry 214 to identifying an unwanted or undesirable behavior, send a warning or advisory message or notification to other components or systems, or communicate with the machine learning engine 166 to exclude the simulation from training. As noted above, in some implementations, the validation logic 306 may directly send instructions to other components of the system 172 to perform actions based on the detection of an incident rather than the result publisher 308. Additionally, in some implementations, the result publisher 308 produces and outputs or stores validated simulation data for the validated the simulation scenario. For example, this may be simulation data 212 identified as being validated, or it may be a copy of the simulation data that has been validated, or it may be the simulation data for the validated simulation scenario augmented with other validation information. It should be noted that this validated simulation data has validated the simulation scenario at the condition level or individual simulation monitor level.

Figure 3B:
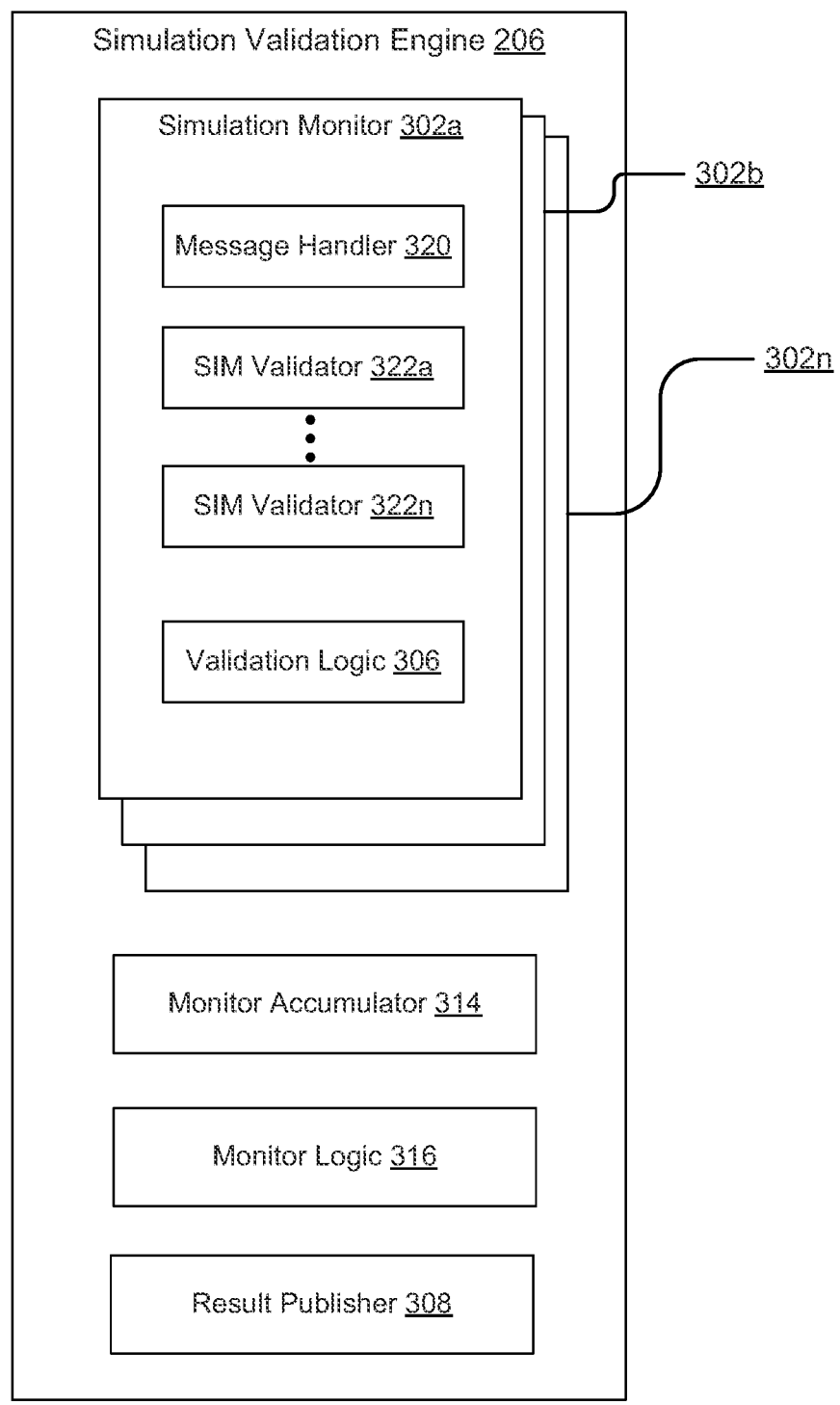

Referring to FIG. 3B, another example implementation of the simulation validation engine 206 is illustrated in greater detail. In the example implementation of FIG. 3B, the simulation validation engine 206 includes one or more simulation monitors 302a, 302b, . . . 302n, a monitor accumulator 314, monitor logic 316, and a result publisher 308. In contrast to the implementation of FIG. 3A, this implementation includes the monitor accumulator 314 and the monitor logic 316 which allows incidents detected by different simulation monitors 302 to be prioritized, combined or grouped. It should be noted that this logical combination is at the simulation monitor 302 level (e.g., incidents) as opposed to the simulation validator 322 level (e.g., conditions).

Similar to the implementation described above with reference to FIG. 3A, the simulation monitor 302 may include a message handler 320, one or more simulation validators 322a . . . 322n, and validation logic 306. Some of the components depicted in the block diagram of FIG. 3B have the same or similar functionality as the components with the same reference numerals depicted in the block diagram of FIG. 3A. For example, the message handler 320, simulation validators 322 and the validation logic 306 in the simulation monitor 302 in FIGS. 3A and 3B may have the same or similar functionality. In another example, the result publisher 308 within the simulation monitor 302 in FIG. 3A has the same or similar functionality as the result publisher 308 within the simulation validation engine in FIG. 3B, however, it performs actions responsive to the monitor logic 316 as opposed to the validation logic 306. It should be noted that another difference is that the result publisher 308 is not part of the simulation monitors 302 of FIG. 3B. Rather as shown in FIG. 3B, the validation logic 306 of each simulation monitor 302 is configured for communication to provide a message indicating whether one or more incidents were detected and provide information related to the incident(s) such as whether it succeeded or failed, any advisory or warnings generated, particular messages from validators 322, control instructions to terminate a simulation, etc. Additionally, it should be noted that the validation logic 306 of each simulation monitor 302 sends this information to the monitory accumulator 314.

The monitor accumulator 314 receives messages or signals about incidents detected by the one or more one or more simulation monitors 302a . . . 302n from their respective validation logic 306. The monitor accumulator 314 identifies a status (e.g., succeed/pass or fail) of the incidents being detected. It should be noted that these messages describe the status of an incident as terminating, succeeding, failing or warning as compared with the messages from a particular simulation validator 322 about a condition succeeding or failing. This provides information at a higher level of classification and the grouping of incidents with other incidents that was not capable before. In one implementation, the monitor accumulator 314 combines the output from one or more simulation monitors 302a . . . 302n active in processing the messages broadcast by the simulation execution engine 204 into a status map. In one example implementation, the monitor accumulator 314 generates the status map by mapping a status indicating success or failure of the incident check performed by one or more simulation monitors 302a . . . 302n to the corresponding identifiers of the one or more simulation monitors 302a . . . 302n. The monitor accumulator 314 sends the status map to the monitor logic 316 for further analysis. In one example implementation, the monitor accumulator 314 stores the status map as part of the simulation log 216 in the data storage 280.

The monitor logic 316 in this implementation of the simulation validation engine 206 receives the status map from the monitor accumulator 314, checks the status map to determine whether a logical combination of incidents is satisfied, and validates a simulation scenario. In some implementations, the individual validation of different incidents by a plurality of simulation monitors 302 may be chained together in a logical combination or other grouping. This advantageously allows for prioritization of monitors. As will be described in more detail below with reference to FIG. 5, the monitor logic 316 alone or in combination with the message handlers 320 of the simulation monitors 302 also allows different simulation monitors 302 to be ordered for serial processing, parallel processing, branching and merging. For example, the monitor logic 316 determines whether a first logical combination of incidents associated with terminating a simulation is satisfied based on the status map. If it is satisfied, the monitor logic 316 sends instructions to the simulation execution engine 204 to control the execution of the simulation. In another example, the monitor logic 316 determines whether a second logical combination of incidents associated with generating warnings in a simulation is satisfied based on the status map and takes an action such as storing a log of warnings for the simulation during its execution. In yet another example, the monitor logic 316 determines whether a third logical combination of incidents associated with failing a simulation is satisfied based on the status map, classifies the simulation run as a failure, and appends the failure to a list of simulation failures. The monitor logic 316 may classify execution of a simulation as a success, a failure, a success with warning, or as terminated based on checking the status of each validation check corresponding to the logical combination of incidents using the status map.

The result publisher 308 is coupled to the monitor logic 316 to receive status messages indicating whether a group or combination of incidents have a given condition. The result publisher 308 in this implementation performs similar functions to those described above with reference to FIG. 3A but at the incident level for the monitor logic 316 instead of the validator level for the validation logic 306. In other words, validation is at a global level for all the simulation monitors 302 in the simulation validation engine 206. In some implementations, the result publisher 308 produces and outputs or stores validated simulation data for the validated the simulation scenario. For example, this may be simulation data 212 identified as being validated, or it may be copy of the simulation data that has been validated, or it may be the simulation data for the validated simulation scenario augmented with other validation information.

Simulation Validator

Figure 4:
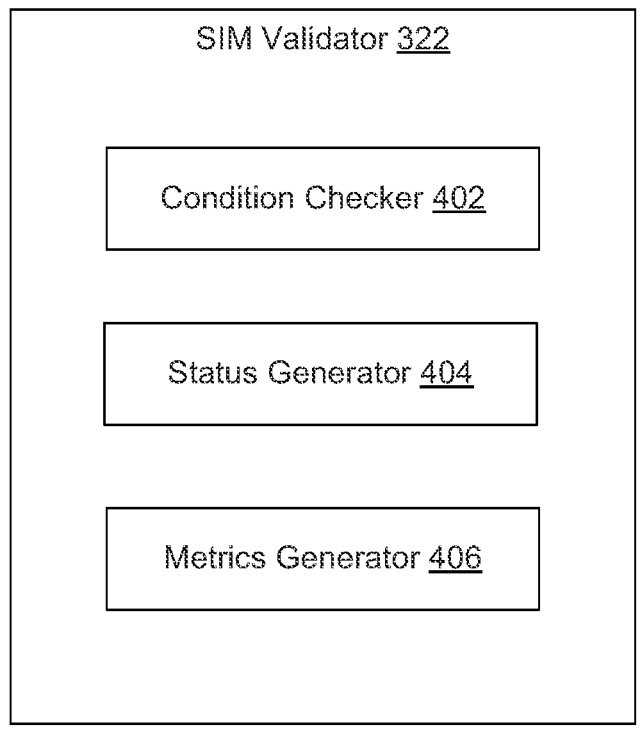
FIG. 4 is a block diagram illustrating an example implementation of a simulation validator referenced in FIGS. 3A and 3B.

Referring to FIG. 4, an example implementation of the simulation validator 322 is illustrated in greater detail. The simulation validator 322 includes a condition checker 402, a status generator 404, and a metrics generator 406.

The condition checker 402 receives the subset of messages from the message handler 320. For example, the messages may be generated from a simulation of one or more scenarios in a perception simulation or a planning simulation. The condition checker 402 stores a current value and timestamp associated with the received messages. The condition checker 402 determines whether the messages satisfy the validation condition associated with the validator 322. For example, the condition checker 402 evaluates a current value of the message against the validation condition to determine whether the validation condition is satisfied or not. In some implementations, the condition checker 402 signals whether the validation condition is satisfied or not after each message is evaluated. In some implementations, the condition checker 402 signals whether the validation condition is satisfied or not at predetermined times, intervals or points in a simulation. The condition checker 402 outputs these signals to the status generator 404.

The status generator 404 generates a status message indicating whether the validation condition is satisfied based on the signals received from the condition checker 402. The signals sent by the condition checker 402 include a satisfied or not indication and other metadata associated with the condition being evaluated, for example, time stamps, warnings, advisories, or other simulation state information. The status message may identify a success or fail status of the validation check and a timestamp in the simulation when the message associated with the autonomous vehicle condition was validated. In some implementations, the status generator 404 stores the status message as part of the simulation log 216 in the data storage 280. In some implementations, the messages produced by the status generator 404 include an instruction for termination of the simulation based on the outcome of the validation check. In other example implementations, the messages produced by the status generator 404 do not include instructions for termination of the simulation based on the outcome of the validation but only an indication of failure and a time stamp of when failure occurred. In some implementations similar to FIGS. 3A and 3B above, the status generator 404 of each simulation validator 322 sends the status message to the validation logic 306 in the simulation monitor 302. In other implementations, the status generator 404 can be configured to send the status message to one or more of the validation logic 306, the result publisher 308 in the simulation monitor 302 as in FIG. 3A, the monitor accumulator 314, the monitor logic 316, and the result publisher 308 in the simulation validation engine 206 as in FIG. 3B. In still other implementations, the status generator 404 sends the status message to the metrics generator 406 for generation of different statistics.

The metrics generator 406 may generate metrics associated with the simulation validator 322 checking the validation condition for validating the simulation scenarios. The metrics generator 406 generates metrics including, but not limited to, time-series statistics and summary statistics. The metrics generator 406 stores the metrics in the simulation log 216 data storage 280. In some implementations, the metrics generator 406 provides an interface to output the metrics. The metrics generator 406 enables the metrics to be queried. For example, the metrics may include information, such as a percentage of validation condition check success, a percentage of validation condition check failure, a percentage of validation condition checks performed per simulation, etc.

As described above with reference to FIGS. 3A and 3B, the validation framework in the simulation validation engine 206 may support one or more simulation validators 322a . . . 322n in each of the simulation monitors 302a, 302b . . . 302n. In some implementations, the one or more simulation validators 322a . . . 322n may include multiple validators 322 of the same type. For example, a simulation monitor 302 may group together a first speed validator for validating speeds greater than 25 miles per hour, a second speed validator for validating speeds greater than 40 miles per hour, a third speed validator for validating speeds greater than 65 miles per hour, and so on. In other implementations, different validators may be implemented to validate different aspects or specific behaviors of an autonomous vehicle in the simulation of a simulation scenario. Example simulation validators 322a . . . 322n include the following:

For example, consider a speed of an autonomous vehicle as a specific aspect to validate in a simulation of a simulation scenario. A speed validator may be configured to receive and process autonomous vehicle state messages during the execution of one or more simulations. The vehicle state message may correspond to a speed of the autonomous vehicle. The speed validator determines whether the speed of the autonomous vehicle enters or exits nominated speed limits after a nominated time. For example, the speed validator may check to see if the speed is greater than 30 meters/second after 10 seconds. In another example, the speed validator may check to see if the speed is less than 10 meters/second after 30 seconds.

As another example, consider elapsed time in a simulation. A time validator may be configured to determine whether a threshold of time has elapsed during an execution of a simulation. For example, the time validator may check to see if the elapsed time is greater than 90 seconds.

As yet another example, consider distance traveled by the autonomous vehicle as an aspect to validate in the simulation. A distance validator may be configured to receive and process autonomous vehicle state messages. Specifically, the distance validator uses speed and time of travel observed in the simulation to compute distance traveled by the autonomous vehicle. The distance validator determines whether the distance is above or below a nominated threshold after a nominated time.

Suppose a simulation scenario is to be inspected for collisions between the autonomous vehicle and other vehicles in the simulation. A collision validator may be configured to receive information about the state of bounding boxes denoting vehicles in the simulation and determine whether there is an overlap between the bounding boxes. For example, the collision detector may check the overlap between a bounding box of the autonomous vehicle and a bounding box of one or more other vehicles in the simulation. The collision validator determines a collision has occurred if an overlap is detected between the bounding boxes of autonomous vehicles and the other vehicles. This collision validator may also be used to compare objects in the simulation for collision with the autonomous vehicle.

As another example, suppose passenger experience in an autonomous vehicle in a simulation is impacted by certain driving maneuvers including sudden acceleration and/or braking. A passenger experience validator may be configured to receive vehicle pose data (e.g., speed, location, orientation) of the autonomous vehicle in the simulation and build up a circular buffer data structure for storing samples of sudden acceleration and/or jerks. The passenger experience validator determines whether the acceleration or jerk samples averaged over a buffer window of the circular buffer data structure exceed nominated thresholds for passenger experience in an autonomous vehicle observed in the simulation. If an average of the acceleration or jerk samples over a buffer window exceed nominated thresholds for passenger experience, e.g., how comfortable a ride is, the passenger experience validator determines that the drive in the autonomous vehicle may be outside of expected passenger experience.

In another example, validating a plan trajectory for an autonomous vehicle is performed in response to a set of specified object constraints, autonomous vehicle localization constraints, and background environment (e.g., static object) constraints. A planner checklist may include a list of checks required to be done or considered in planning a proper trajectory of the autonomous vehicle. A checklist validator receives a planner checklist in a planning simulation and if any of the checks included in the planner checklist fail, the checklist validator triggers a failure. In some implementations this validator may be simplified to be a goal reached validator where only the end position and location of the autonomous vehicle independent of the path used to reach the end goal.

As yet another example, consider a nominated gate traversed by the autonomous vehicle as an aspect to validate in the simulation scenario. A gate, in particular, may be used to represent a permissible vehicle pose within a geographical area, i.e., a valid or allowed pose or position for autonomous vehicle within the geographical area, and may be analogized in some instances to a gate used in downhill skiing, such that a sequence of gates may be used to define a potential path a vehicle may take through a geographical area. In some instances, a gate may merely define a position, while in other instances an orientation may also be defined to represent the direction a vehicle will travel when passing through the gate.

A gate validator may be configured to receive vehicle pose data of the autonomous vehicle to detect whether the autonomous vehicle passed through a nominated gate in the simulation. A first example use case may include the gate validator configured to confirm or determine whether the autonomous vehicle changed lanes within a specified region. A second example use case may include the gate validator configured to detect whether the autonomous vehicle drove past a barrier, such as a stop line. A third example use case may include the gate validator configured to determine whether the autonomous vehicle clears an area of interest, such as a school zone. A fourth example use case may include the gate validator configured to determine whether the autonomous vehicle has successfully negotiated an intersection.

Suppose a simulation scenario includes an autonomous vehicle deviating from a lane. A lateral offset validator may be configured to receive vehicle pose data of the autonomous vehicle and determine whether there is a lateral offset in the autonomous vehicle location and orientation during a simulation of a simulation scenario. If the lateral offset exceeds a threshold, the lateral offset validator determines abnormal lateral movement observed in the autonomous vehicle. A first example use case may include the lateral offset validator configured to detect whether an autonomous vehicle is making unexpected lateral departures from a lane. A second example use case may include the lateral offset validator configured to detect lateral deviations of the autonomous vehicle within the lane from a center of the lane.

A lateral wiggle validator may be a variation of the lateral offset validator. The lateral wiggle validator may be configured to receive vehicle pose data of the autonomous vehicle and store lateral offset samples in a circular buffer data structure covering a prescribed time window. The lateral wiggle validator determines a variance over the stored lateral offset samples. If the variance exceeds nominal bounds of tolerance, it is indicative of the autonomous vehicle is changing lateral position in the lane (e.g., wiggles, shakes, or wobbles) in the simulation.

In another example, a geodesic distance validator may be configured to receive vehicle pose data of the autonomous vehicle in the simulation and determine a geodesic distance between the autonomous vehicle and a nominated reference object. The geodesic distance validator determines whether the geodesic distance is within nominated bounds. A first example use case may include the geodesic distance validator configured to determine a position where the autonomous vehicle stops relative to a stop line based on the speed the autonomous vehicle is traveling using the geodesic distance. A second example use case may include the geodesic distance validator configured to detect whether the autonomous vehicle has passed a precise location using the geodesic distance.

In another example, a simulation scenario may be created to deliberately include an example of reckless driving by an autonomous vehicle. A reckless driving validator may be configured to receive tracking information about vehicles in the simulation and compute variables, such as a distance range, difference in speed, and time to simulated collision between the bounding boxes of the autonomous vehicle and the other vehicles. The reckless driving validator analyzes the computed variables to determine whether the autonomous vehicle in the simulation is travelling too fast for the distance range between the autonomous vehicle and the other vehicles. An example use case may include the reckless driving validator detecting behaviors of the autonomous vehicle in the simulation that, in the real world, may confuse or concern human drivers on the road.

In another example, consider a traffic light transition ignored by an autonomous vehicle as an aspect to validate in the simulation. A traffic light validator receives environment data and localization data of the autonomous vehicle from the execution of the simulation and determines a speed and distance of the autonomous vehicle to a stop line when the traffic light transitions from green to red or red to green. The traffic light validator uses a functionality of the gate validator to determine whether the autonomous vehicle stopped at the stop line. The traffic light validator determines whether a forecast time to arrival at the stop line for the autonomous vehicle is higher than a nominated threshold and that the autonomous vehicle failed to stop. An example use case may include the traffic light validator configured to detect, in the simulation, an unwanted behavior referred to as "Amber Gambler" in which a car speeds through the traffic light stop before the traffic light transitions from green to red or in advance of the traffic light transitioning to green.

From the above description of example simulation validators 322, it can be understood how advantageous the present system and methods are because they allow the status messages produced by any number of simulation validators 322 to be combined by the validation logic 306 in any number of different ways to measure any type of incident that needs to be validated to remove unwanted behavior and noise. Since there are hundreds of base scenarios, and tens of thousands of experiments, using the configurable simulation monitors 302 and their configurable simulation validators 322 thousand of different types of incidents can be defined, corresponding simulation monitors 302 created, and then used to effectively filter the simulations to identify the simulation scenarios that produce unwanted behaviors and that should not been used by the machine learning engine 166 to produce machine learning models 224.

Figure 5:
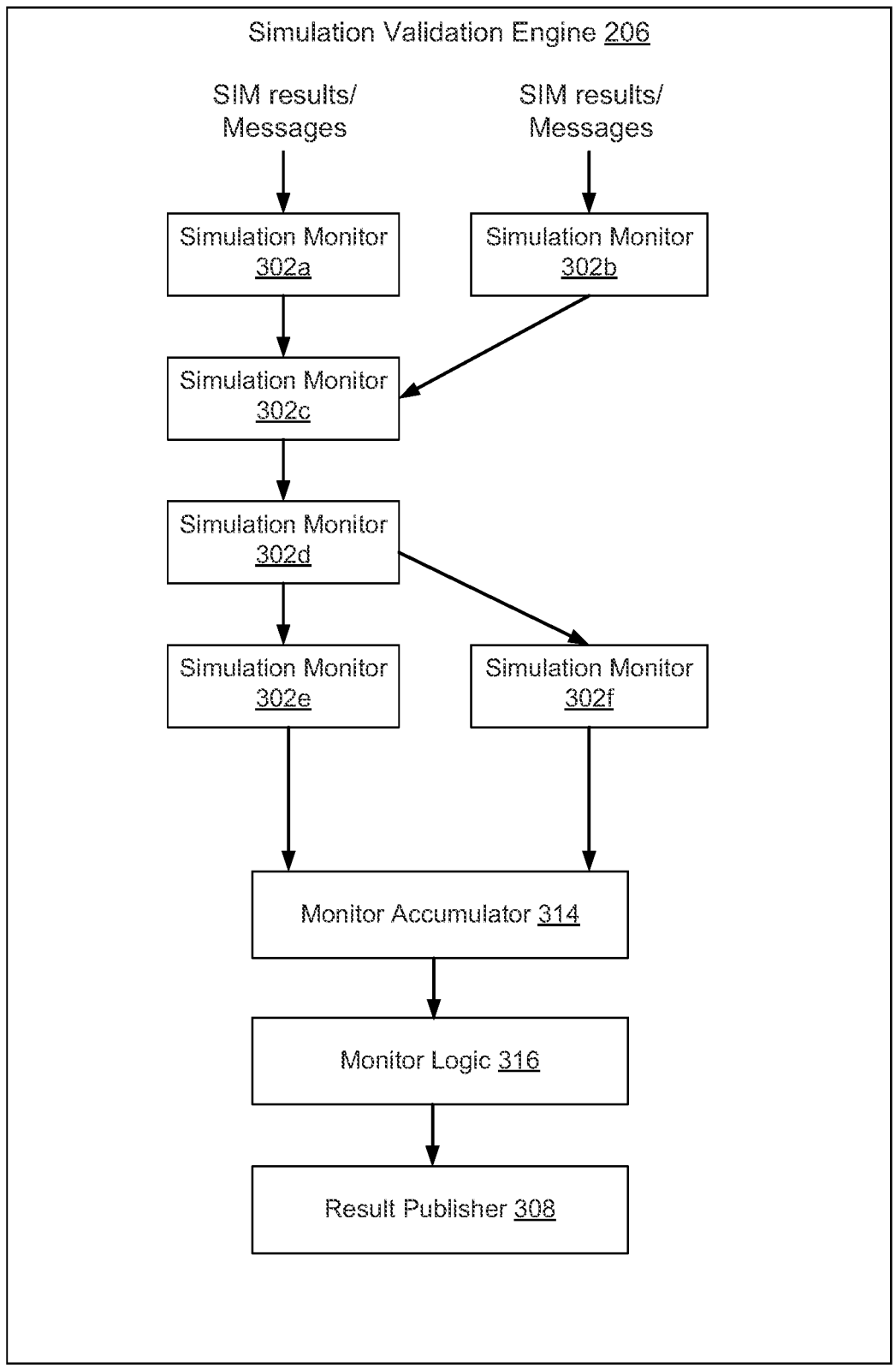
FIG. 5 is a block diagram illustrating one example implementation of processing flow through components of a simulation validation engine referenced in FIG. 3B.

FIG. 5 is a block diagram illustrating an example representation of the processing of incidents through the components of a simulation validation engine 206. As has been noted above, the simulation validation system 160 advantageously allows for prioritization of monitors 302. FIG. 5 is provided to illustrate that the simulation validation system 160 enables different simulation monitors 302 to be ordered for serial processing, parallel processing, branching and merging. Although not shown in FIG. 5, the prioritization may include termination of the simulation, so if a prioritized simulation monitor 302 was to terminate the simulation, later priority simulation monitors 302 may not execute, thereby providing a computational savings. It should be noted that FIG. 5 is a representation of the process flow and not necessarily the actual processing of messages by the different simulation monitors 302 and the monitor logic 316 may be different. The monitor logic 316 alone or in combination with the message handlers 320 of the simulation monitors 302 allows the output of different simulation monitors 302 to be combined or grouped arithmetically, logically or by Boolean combination to produce prioritization as shown in FIG. 5 and described below. For example, the message handlers 320 of different simulation monitors 302 can control when messages are processed and thus, when the simulation monitors 302 send status messages to the monitor accumulator 314 or the monitor logic 316. In another example, the timing of the processing of the status map provided by the monitor accumulator 314 to the monitor logic 316 can be configured by the monitor logic 316. Thus, the validation of different incidents represented by their respective simulation monitors 302 can be prioritized and order by the monitor logic 316.

In FIG. 5, an example arrangement of six simulation monitors 302a . . . 302f is depicted for processing the simulation results or messages generated from the execution of a simulation. The sequence illustrated in FIG. 5 is merely an illustrative example. This example arrangement is used to show how the simulation validation system 160 enables different simulation monitors 302 to be prioritized or ordered for serial processing, parallel processing, branching or merging. More specifically, simulation monitors 302a, 302c, 302d, and 302e illustrate an example of serial processing of the validation of four incidents. For example, the simulation monitor 302a receives the messages and processes a subset of messages to detect a first incident and sends the remaining messages to the simulation monitor 302c next in series which processes a relevant portion of the remaining messages to detect a second incident and so on. If the simulation monitor 302a detects the first incident and determines to terminate the simulation, then the serial processing of messages stops with the first simulator monitor 302a and does not proceed further down the rest of the simulation monitors 302c, 302d, and 302e in the series configuration. In another example implementation, the simulation monitors 302a and 302b implement a parallel processing of the messages. For example, the simulation monitors 302a and 302b independently process the messages and detect respective different incidents of unwanted behavior in the simulation pertinent to their configuration. In another example implementation, the first simulation monitor 302a receives a first subset of messages, processes the first subset of messages to detect a first incident; and the second simulation monitor 302b receives a second subset of messages, processes the second subset of messages to detect a second incident. If either the first simulation monitor 302a or the second simulation monitor 302b detects its respective incident and terminates the simulation, then the processing of messages stops. But if not, the third simulation monitor 302c receives and processes the first subset of messages and the second subset of messages to validate a third incident, and effectively, the third simulation monitor 302c merges the processing of messages. In another example, the fourth simulation monitor 302d processes a subset of messages pertinent to its configuration and sends the same subset of messages to both the fifth simulation monitor 302d and the sixth simulation monitor 302e, thereby effectively branching the processing of messages. It will be appreciated that there may be multiple paths for processing the messages through the example arrangement of simulation monitors 302a . . . 302f before the flow reaches the monitor accumulator 314. In one implementation, the monitor accumulator 314 receives the output of only the fifth simulation monitor 302d and the sixth simulation monitor 302e and combines them into a status map. In another implementation, the monitor accumulator 314 receives the output from all six simulation monitors 302a . . . 302f and combines them into a status map. The monitor logic 316 receives the status map and determines whether a logical combination of validated incidents is satisfied using the status map, and uses the logical combination to control and classify the execution of the simulation by the simulation execution engine 204 either directly or by sending instructions to the result publisher 308 to publish a simulation validation result to other components of the system 172 and 100.

Figure 6:
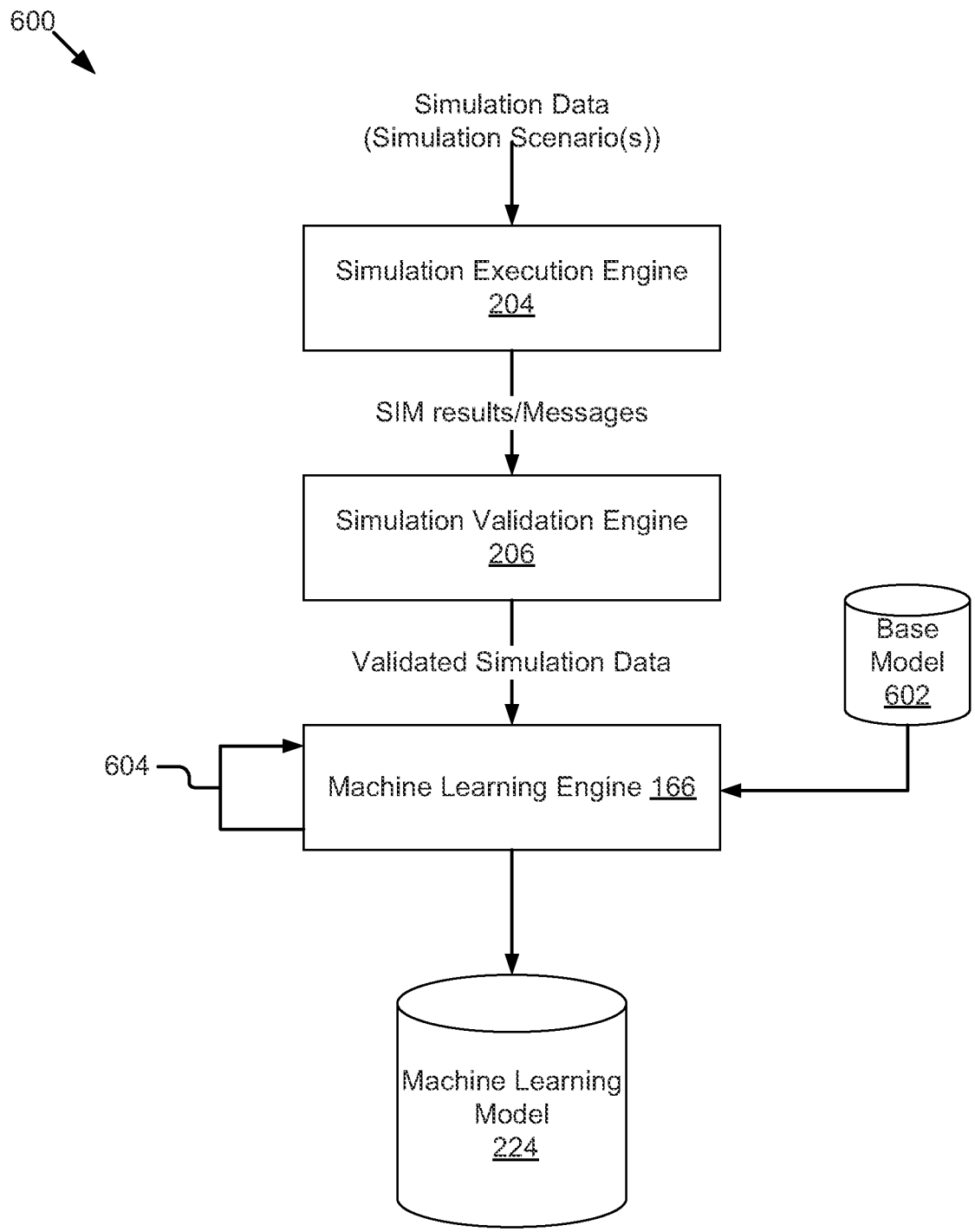
FIG. 6 is a block diagram illustrating an example of a data flow through components of simulation validation system and machine learning engine referenced in FIG. 2.

Referring now to FIG. 6, a block diagram illustrating an example of a data flow through components of simulation validation system 160 and machine learning engine 166 will be described. For example, the data flow between the simulation execution engine 204, the simulation validation engine 206, and the machine learning engine 166 is depicted. The simulation execution engine 204 receives simulation data or simulation scenario as has been described above and executes a simulation based on the simulation scenario. The execution of the simulation generates simulation results or messages encoded with state information associated with the behavior of autonomous vehicle and other actors in the simulation scenario. The simulation validation engine 206 receives the messages and validates the simulation scenario. In some implementations, the simulation validation engine 206 validates the simulation scenario by producing validated simulation data. For example, this may be simulation data 212 identified as being validated, or it may be copy of the simulation data that has been validated, or it may be the simulation data for the validated simulation scenario augmented with other validation information. The validated simulation data from the validated simulation scenario is then used to train a machine learning model 224. The machine learning engine 166 retrieves a base model 602 and uses the validated simulation data to train the base model 602 and generate a trained machine learning model 224. The validated simulation data may be repeatedly and iteratively used to improve the accuracy of the machine learning model 224 as represented by line 604 to and from the machine learning engine 166 in FIG. 6. Thus, the validated simulation data may also be used for re-training or refinement of the machine learning model 224. Since the simulation monitors 302a ... 302f are configurable as noted above with regard to FIG. 5 and may include any number of different configurations of simulation validators 322, the simulation validation system 160 is particularly advantageous because it can identify validated sets of data for a specific parameter that can in turn be used to provide greater accuracy and refinement of the machine learning model 224. For example, one or more simulation monitors 302 can be configure to validate a particular incident related to the accuracy of LIDAR and whether it identified a pedestrian. The simulation monitors 302 for such a purpose may include various different simulation validators 322 to validate certain parameters such as a shape of an object, a size of an object, 3D representation, collision etc. Once this data has been validated, it can be provided to the machine learning engine 166 to refine the parameters of the machine learning model 224 related to object detection by LIDAR and generate an improved the machine learning model 224. The improved machine learning model 224 can in turn be used by the perception subsystem 154, for example. Various other specific parameters of any of the machine learning models 224 for perception, location, planning or control may be similarly trained or refined using validated data generated specifically for a particular parameter by the simulation validation system 160.

Figure 7:
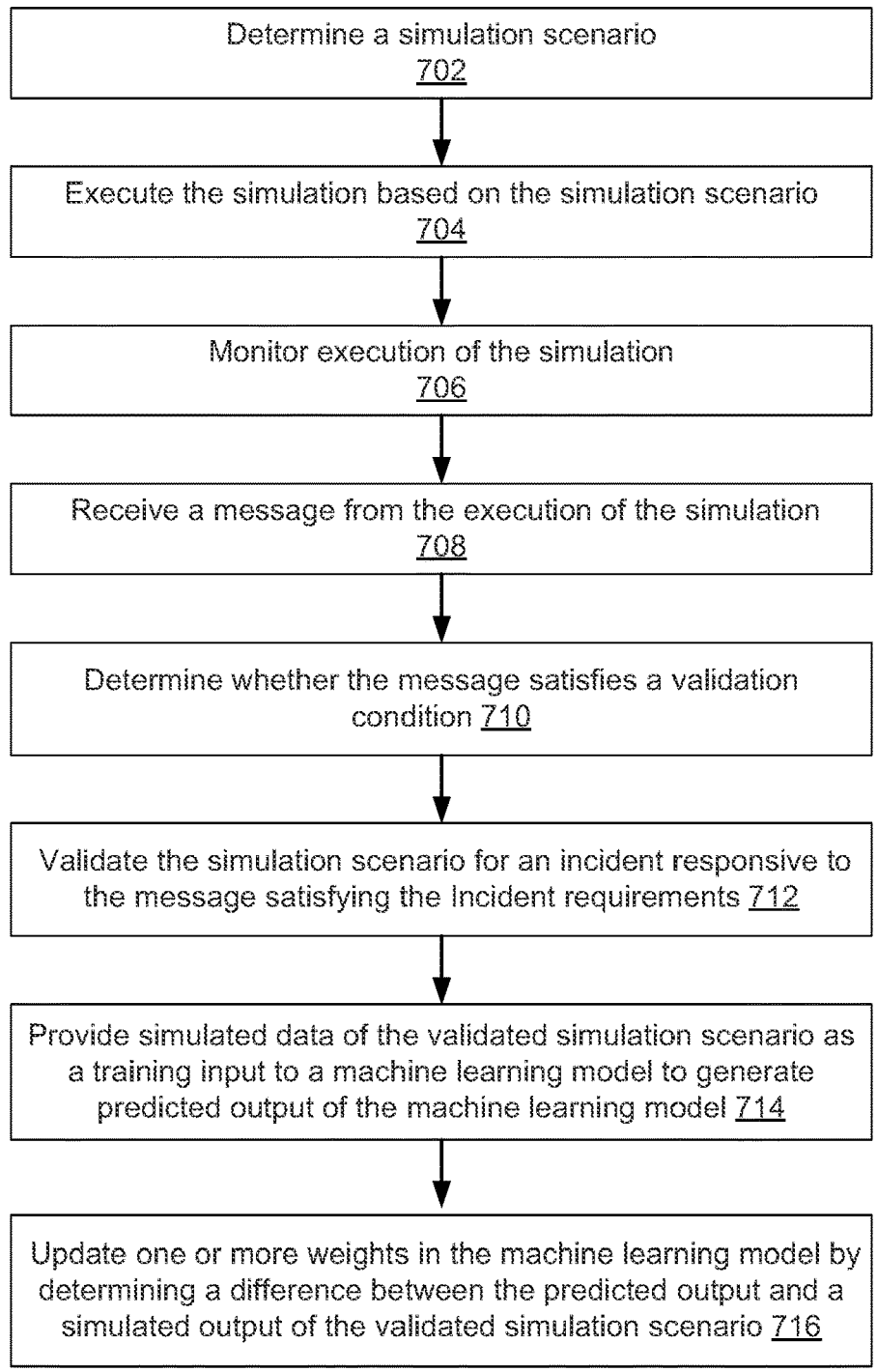
FIG. 7 is a flow chart illustrating a method of validating a simulation scenario in a simulation according to some implementations.

Referring now to FIG. 7, a method 700 of validating a simulation scenario in accordance with an implementation is illustrated. The method 700 may be a sequence of operations or process steps performed by an autonomous vehicle, by another computer system that is separate from the autonomous vehicle (e.g., cloud-based computing system 172 of FIG. 1), or any combination thereof. Moreover, while in some implementations, the sequence of operations may be fully automated, in other implementations some steps may be performed and/or guided through human intervention. Furthermore, it will be appreciated that the order of operations in the sequence may be varied, and that some operations may be performed in parallel and/or iteratively in some implementations.

In block 702, a simulation scenario is determined. For example, a simulation scenario variation may be selected for a simulation run to validate the simulation scenario for use in training the machine learning model 224. The simulation scenario may correspond to an instantiation of a three-dimensional world mimicking a behavior and sensor configuration of an autonomous vehicle in its encounter with other vehicles, pedestrians, and surrounding environment. The simulation scenario may be one of thousands of simulation scenarios that has not been validated and a unique ID, and is stored in the data store 280.

In block 704, the simulation is executed based on the simulation scenario. For example, a configuration of the simulation scenario is fetched from the simulation registry 214 and executed by the simulation execution engine 204. This is based on the identified or determined scenario from block 702. In block 706, an execution of the simulation is monitored. For example, the execution of the simulation generates one or more asynchronous messages. In block 708, one or more messages are received from the execution of the simulation. For example, the one or more messages are received by the simulation monitor 302 in a simulation validation engine 206. There may be one or more simulation monitors 302 that receive the one or more messages. More specifically, the simulation monitor 302 may include one or more simulation validators 322. The messages are sent to the one or more simulation validators 322 for additional processing.

In block 710, a determination is made as to whether the message satisfies a validation condition. For example, the condition checker 402 determines whether a value of the message satisfies the constraints specified by the validation condition. Any particular simulation monitor 302 may have one or more simulation validators 322. Each of these simulation validators 322 receives the messages from block 706 and determines whether its validation condition is satisfied. These simulation validators 322 then send a status message indicating whether the validation check on the processed message was successful (pass) or not (fail) and sends the status message to the validation logic 306.

In block 712, the simulation scenario is validated for an incident responsive to the one or more messages satisfying the validation condition. For example, the simulation scenario is validated to ensure the simulation data excludes unwanted behavior that may bias the machine learning model 224 or noise from logged sensor data. Since there may be one or more validation conditions that must be successful for the simulation scenario to be validated for the incident, the simulation scenario is validated based on the output of the validation logic 306. In some implementations, the validation logic 306 combines the status message from each of the simulation validators 322 for a given simulation monitor 302. For example, if a simulation monitor 302 has three simulation validators 322a, 322b, 322c, then each of those three simulation validators 322a, 322b, 322c provides messages to the validation logic 306 which in turn validates the incident based on the status of the messages. In one implementation where there is only one simulation monitor 302, the output of that simulation monitor 302 validates the simulation scenario for an incident. In implementations where there are two or more simulation monitors 302, the simulation scenario is validated if all the simulation monitors 302 indicate success or is not a validated if even a single simulation monitor 302 indicates failure. In still other implementations, one simulation monitor 302 may validate more than one incident orthogonally and the validation logic 306 signals the validation of one or more incidents.

In block 714, the simulated data of the validated simulation scenario is provided as a training input to the machine learning model 224 to generate a predicted output. For example, the validated simulation scenario may be used to train the machine learning model 224 for use in a planning and/or perception subsystem of the autonomous vehicle 100. A simulated output from execution of the simulation scenario may be generated by running the simulation, retrieving the simulated output from data storage 280, or may have been captured during validation of the simulation scenario. In block 716, a difference between the predicted output and a simulated output of the validated simulation scenario is used to update one or more weights in the machine learning model 224. In some implementations, the trained and tested machine learning model 224 may be deployed to the autonomous vehicle 100.

Figure 8A:
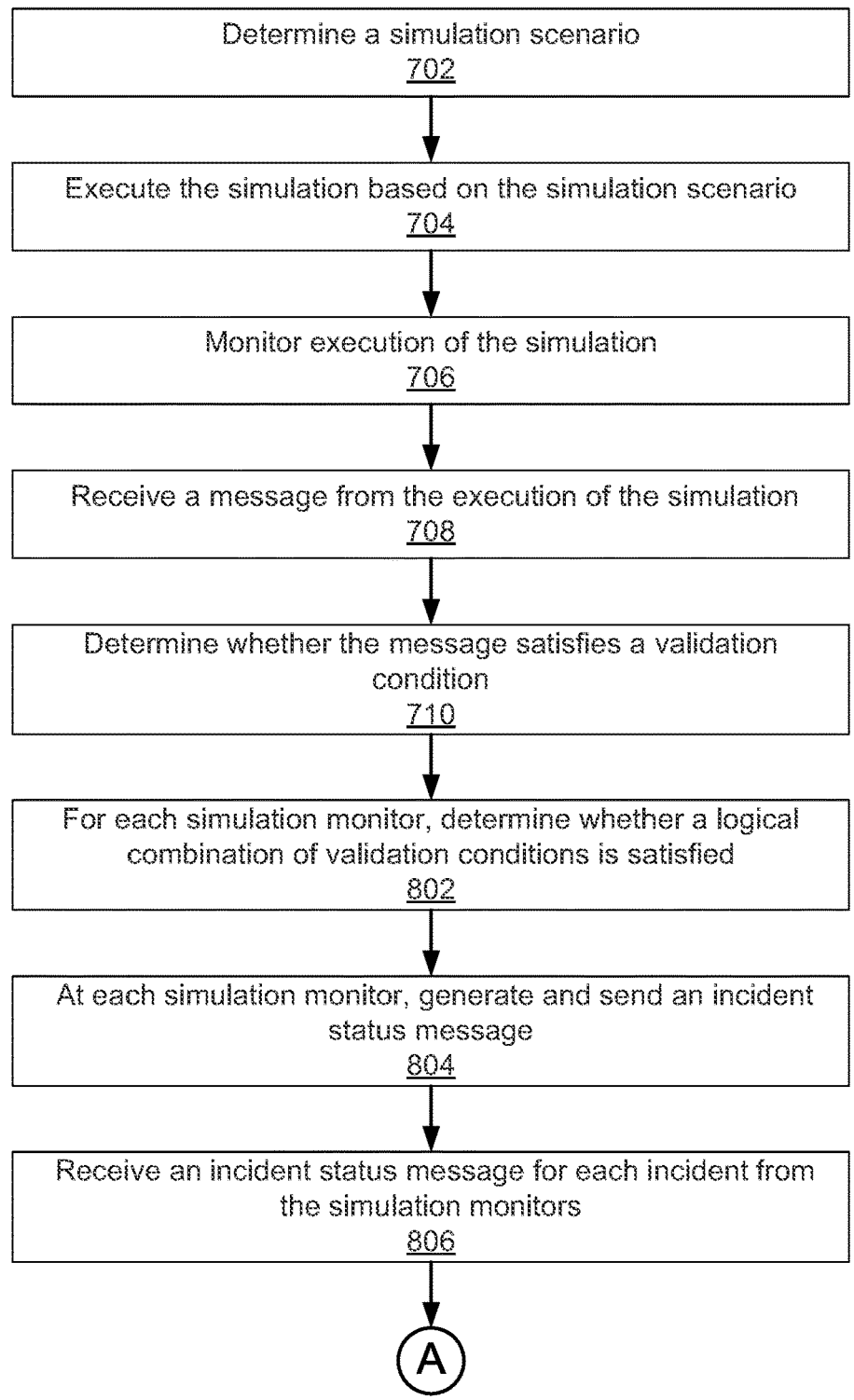
FIGS. 8A and 8B is a flow chart illustrating another method of validating a simulation scenario in a simulation according to some implementations.
Figure 8B:
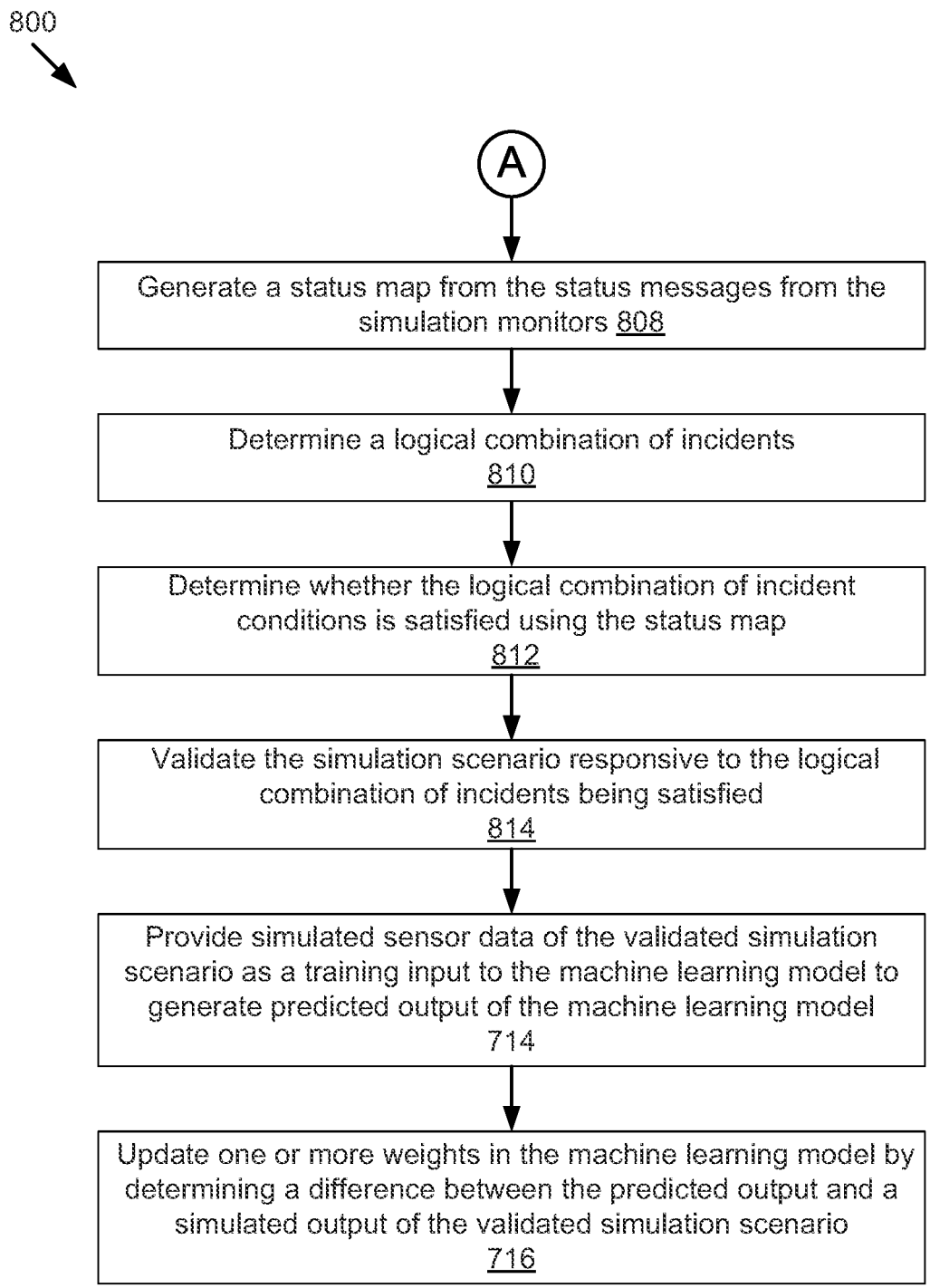

Referring now to FIGS. 8A and 8B, another implementation of a method 800 of validating a simulation scenario is illustrated. This implementation of the method 800 is provided to illustrate an implementation in which the output of a plurality of simulation monitors 302a-302n is accumulated and logically combined to provide validation of a simulation scenario for multiple incidents. This implementation of the method 800 is provided to show a particular advantage of the system 160, specifically, that it allows any logical combination of different incidents to be combined to provide a single validation output of a simulation scenario. Many of the operations in this method 800 are similar to the operations described above with reference to FIG. 7 so like reference numerals have been used for like operations, and those descriptions will not be repeated here for ease of understanding.

As shown in FIG. 8A, the method 800 begins by determining 702 a simulation scenario, executing 704 the simulation, monitoring 706 the execution of the simulation, receiving 708 one or more messages from execution, and determining 710 whether validation conditions have been satisfied. These operations are similar to those described in more detail above. It should be understood that these operations are performed for each of the plurality of simulation monitors 302a-302n. Since in this implementation there are a plurality of simulation monitors 302a-302n, the operations in blocks 702, 704, 706, 708 and 710 may be performed in parallel by each simulation monitor 302, or in serial by different simulation monitors 302 or various other combinations of serial processing and parallel processing like the examples described above with reference to FIG. 5. More specifically, the simulation validators 322a-322n of each simulation monitor 302a-302n performs block 710 and generates validation messages that are send to the respective validation logic 306 for each of the simulation monitors 302a-302n.

In block 802, the method 800 determines whether a logical combination of validation conditions is satisfied for each simulation monitor 302a-302n. For a given simulation monitor 302, its validation logic 306 receives validation messages from each respective simulation validator 322 in the simulation monitor 302. The validation logic 306 combines these validation messages to determine whether the logical combination of validation conditions is satisfied. As noted above, the validation logic 306 may include any number of different groupings or combinations of validation conditions which need to be confirmed and validated. Depending on the messages received from the simulation validators 322, the validation logic 306 will determine that there was a success, a failure and/or a termination of the simulation. The validation logic 306 determines what if any metadata from the messages received should be stored in the simulation log 216 or included in incident messages from the validation logic 306. In some implementations, the validation logic 306 generates multiple status messages for the orthogonal processing of incidents.

In block 804, the validation logic 306 of each simulation monitor 302a-302n generates and sends an incident status message. Since there are multiple simulation monitors 302a-302n in this implementation, there will be multiple incident status messages generated, for example, one from each simulation monitors 302a-302n, and sent by the respective validation logic 306 of each simulation monitor 302a-302n. As noted above, the generation and sending of these incident status messages by each respective simulation monitor 302a-302n can be done at predefined intervals, according to simulation time stamps, or asynchronously. The validation logic 306 of each simulation monitor 302a-302n sends its incident status message to the monitor accumulator 314.

In block 806, the monitor accumulator 314 receives an incident status message for each incident from the simulation monitor 302a-302n validating the incident. In some embodiments, there is a single monitor accumulator 314 that receives an incident status message from each simulation monitor 302a-302n in the simulation validation engine 206. In other embodiments, there may be a plurality of monitor accumulators 314 receiving incident status messages from different simulation monitors 302a-302n. Such a configuration allows the simulation validation engine 206 to validate multiple different groups of simulation incidents.

In block 808, the monitor accumulator 314 uses the received incident status messages to generate a status map of the results of the simulation monitors 302a-302n. The monitor accumulator 314 generates the status map by combining the incident check of the simulation monitors 302a-302n. For example, the status map includes a status indicating: a) a termination incident, b) a success or failure incident, and c) a warning or advisory incident for the incidents being validated by the simulation monitors 302a-302n. Each simulation monitor 302a-302n validates at least one incident, but some simulation monitors 302a-302n may validate multiple incidents. Regardless, the status map includes a status for each incident being detected by the simulation monitors 302a-302n. The monitor accumulator 314 outputs the status map to the monitor logic 316.

In block 810, the monitor logic 316 determines a logical combination of incidents. The monitor logic 316 operates as has been discussed above with reference to FIG. 3B. The monitor logic 316 combines the status of two or more incidents similar to operation of the validation logic 306, but at the monitor level instead of the validator level. The monitor logic 316 may be any combination, grouping or Boolean or arithmetic function on output from typically a plurality of simulation monitors 302a-302n. For example, the logical combination of incident conditions may chain together individual incident conditions of a plurality of simulation monitor 302. In some implementations, the monitor logic 316 receives the status map from the monitor accumulator 314 and determines the logical combination of incidents. Then the monitor logic 316 determines 812 whether the logical combination of incident conditions is satisfied using the status map. In some implementations, there is only one monitor logic 316 for providing a single validation of all incidents corresponding to all the simulation monitors 302a-302n in the simulation validation engine 206; however, in other implementations there may be two or more sets of monitor logic 316 to validate multiple different groups of simulation incidents. In still other implementations where there is orthogonal incident validation, the validated incidents may be signaled individually. Each different set of monitor logic 316 could be coupled to receive a status map from a corresponding monitor accumulator 314.

In block 814, the simulation scenario is validated responsive to the logical combination of incidents being satisfied. Validating the combination of incidents may include signaling a success in the execution of the simulation, a failure in the execution of the simulation, termination in the execution of the simulation, or a success or failure with an associated warning in the execution of the simulation. For example, the output of the monitor logic 316 is provided to the result publisher 308 to indicate validation of the combination of incidents. This validation result can be stored to the data storage 280 for inclusion in the simulation log 216, the simulation registry 214 or added to the simulation data.

In some implementations, the validation result is sent to the machine learning engine 166 for its use. Similar as described above with reference to FIG. 7, in block 714, the simulated sensor data of the validated simulation scenario is provided as a training input to the machine learning model 224 to generate a predicted output. In block 716, a difference between the predicted output and a simulated output of the validated simulation scenario is used to update one or more weights in the machine learning model 224.

The previous description is provided to enable practice of the various aspects described herein. Various modifications to these aspects will be understood, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable others to make or use the disclosed subject matter. Various modifications to these implementations will be readily apparent, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated, the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be implemented in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable others to make or use the present disclosure. Various modifications to these examples will be readily apparent, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method of validating a simulation scenario to be used in training a machine learning model of an autonomous vehicle, the method comprising:
    executing a simulation to simulate a behavior of the autonomous vehicle based on the simulation scenario, simulation data in the simulation scenario being a training example to be used in training the machine learning model prior to its deployment in the autonomous vehicle;
    monitoring the execution of the simulation and receiving a first message including state information of the autonomous vehicle based on a simulated behavior of the autonomous vehicle during the execution of the simulation;
    determining, by a first simulation validator, whether the first message including the state information of the autonomous vehicle satisfies a first condition, the first condition evaluating a first aspect of the simulated behavior of the autonomous vehicle against a first threshold;
    responsive to determining that the first message including the state information of the autonomous vehicle satisfies the first condition, signaling a success in the execution of the simulation and validating the simulated behavior of the autonomous vehicle in the simulation scenario as being exclusive of the first aspect of the simulated behavior of the autonomous vehicle that may unwantedly bias the machine learning model;
    generating a training instance including the validated simulated behavior of the autonomous vehicle in the simulation scenario; and
    training the machine learning model using the training instance including the validated simulated behavior of the autonomous vehicle in the simulation scenario.

2. The method of claim 1, wherein the execution of the simulation generates a simulated output of the simulation scenario, and the method further comprises:
    providing the validated simulated behavior of the autonomous vehicle in the simulation scenario as a training input to the machine learning model to generate a predicted output of the machine learning model; and
    updating one or more weights in the machine learning model based on a difference between the predicted output and the simulated output of the simulation scenario.

3. The method of claim 1, further comprising signaling termination of the execution of the simulation in response to determining that the first message does not satisfy the first condition.

4. The method of claim 1, further comprising signaling one or more of:
    a failure in the execution of the simulation in response to determining the first message does not satisfy the first condition; and
    an advisory message about the execution of the simulation.

5. The method of claim 1, wherein the simulation scenario is a three-dimensional virtual scene simulating an encounter between the autonomous vehicle and an entity in a surrounding environment of the autonomous vehicle.

6. The method of claim 1, wherein the first simulation validator comprises one from a group of a timer validator, a speed validator, a distance validator, a collision validator, a passenger experience validator, a region validator, a lateral offset validator, a lateral wiggle validator, a traffic light validator, and a reckless driving validator.

7. The method of claim 1, wherein monitoring the execution of the simulation includes receiving a second message from the execution of the simulation, and the method further comprises:
    determining, by a second simulation validator, whether the second message satisfies a second condition, the second condition evaluating a second aspect of the simulated behavior of the autonomous vehicle against a second threshold; and
    wherein the validating the simulation data in the simulation scenario is responsive to a logical combination of the first message satisfying the first condition and the second message satisfying the second condition.

8. The method of claim 7, wherein the first simulation validator and the second simulation validator are a same type.

9. The method of claim 7, further comprising:
    generating metrics associated with the first simulation validator and the second simulation validator; and
    storing the metrics in a database.

10. The method of claim 1, further comprising:
    receiving a plurality of messages from the execution of the simulation representing time series data;
    buffering the plurality of messages for the first simulation validator; and
    determining, by the first simulation validator, whether the plurality of messages satisfies the first condition.

11. A system comprising one or more processors and memory operably coupled with the one or more processors, wherein the memory stores instructions that, in response to execution of the instructions by the one or more processors, cause the one or more processors to perform operations including:
    executing a simulation to simulate a behavior of an autonomous vehicle based on a simulation scenario, simulation data in the simulation scenario being a training example to be used in training a machine learning model of the autonomous vehicle prior to its deployment in the autonomous vehicle;
    monitoring the execution of the simulation and receiving a first message including state information of the autonomous vehicle based on a simulated behavior of the autonomous vehicle during the execution of the simulation;
    determining, by a first simulation validator, whether the first message including the state information of the autonomous vehicle satisfies a first condition, the first condition evaluating a first aspect of the simulated behavior of the autonomous vehicle against a first threshold;

responsive to determining that the first message including the state information of the autonomous vehicle satisfies the first condition, signaling a success in the execution of the simulation and validating the simulated behavior of the autonomous vehicle in the simulation scenario as being exclusive of the first aspect of the simulated behavior of the autonomous vehicle that may unwantedly bias the machine learning model;

generating a training instance including the validated simulated behavior of the autonomous vehicle in the simulation scenario; and training the machine learning model using the training instance including the validated simulated behavior of the autonomous vehicle in the simulation scenario.

12. The system of claim 11, wherein the execution of the simulation generates a simulated output of the simulation scenario and wherein the operations further comprise:

providing the validated simulated behavior of the autonomous vehicle in the simulation scenario as a training input to the machine learning model to generate a predicted output of the machine learning model; and updating one or more weights in the machine learning model based on a difference between the predicted output and the simulated output of the simulation scenario.

13. The system of claim 11, wherein the operations further comprise signaling termination of the execution of the simulation in response to determining that the first message does not satisfy the first condition.

14. The system of claim 11, wherein the operations further comprise signaling one or more of:

a failure in the execution of the simulation in response to determining the first message does not satisfy the first condition; and an advisory message about the execution of the simulation.

15. The system of claim 11, wherein the simulation scenario is a three-dimensional virtual scene simulating an encounter between the autonomous vehicle and an entity in a surrounding environment of the autonomous vehicle.

16. The system of claim 11, wherein the first simulation validator comprises one from a group of a timer validator, a speed validator, a distance validator, a collision validator, a passenger experience validator, a region validator, a lateral offset validator, a lateral wiggle validator, a traffic light validator, and a reckless driving validator.

17. The system of claim 11, wherein monitoring the execution of the simulation includes receiving a second message from the execution of the simulation and wherein the operations further comprise:

determining, by a second simulation validator, whether the second message satisfies a second condition, the second condition evaluating a second aspect of the simulated behavior of the autonomous vehicle against a second threshold; and wherein the validating the simulation data in the simulation scenario is responsive to a logical combination of the first message satisfying the first condition and the second message satisfying the second condition.

18. The system of claim 17, wherein the operations further comprise:

generating metrics associated with the first simulation validator and the second simulation validator; and storing the metrics in a database.

19. The system of claim 11, wherein the operations further comprise:

receiving a plurality of messages from the execution of the simulation representing time series data;

buffering the plurality of messages for the first simulation validator; and determining, by the first simulation validator, whether the plurality of messages satisfies the first condition.

20. A non-transitory computer readable storage medium storing computer instructions executable by one or more processors to perform a method of validating a simulation scenario to be used in training a machine learning model of an autonomous vehicle, the method comprising:

executing a simulation to simulate a behavior of the autonomous vehicle based on the simulation scenario, simulation data in the simulation scenario being a training example to be used in training the machine learning model prior to its deployment in the autonomous vehicle;

monitoring the execution of the simulation and receiving a first message including state information of the autonomous vehicle based on a simulated behavior of the autonomous vehicle during the execution of the simulation;

determining, by a first simulation validator, whether the first message including the state information of the autonomous vehicle satisfies a first condition, the first condition evaluating a first aspect of the simulated behavior of the autonomous vehicle against a first threshold;

responsive to determining that the first message including the state information of the autonomous vehicle satisfies the first condition, signaling a success in the execution of the simulation and validating the simulated behavior of the autonomous vehicle in the simulation scenario as being exclusive of the first aspect of the simulated behavior of the autonomous vehicle that may unwantedly bias the machine learning model;

generating a training instance including the validated simulated behavior of the autonomous vehicle in the simulation scenario; and training the machine learning model using the training instance including the validated simulated behavior of the autonomous vehicle in the simulation scenario.

* * * * *